(12) United States Patent
Li et al.

(10) Patent No.: US 11,399,139 B2
(45) Date of Patent: *Jul. 26, 2022

(54) HIGH DYNAMIC RANGE CAMERA ASSEMBLY WITH AUGMENTED PIXELS

(71) Applicant: Facebook Technologies, LLC, Menlo Park, CA (US)

(72) Inventors: Fengqiang Li, Redmond, WA (US); Michael Hall, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/000,979

(22) Filed: Aug. 24, 2020

(65) Prior Publication Data

US 2020/0389587 A1    Dec. 10, 2020

Related U.S. Application Data

(63) Continuation of application No. 16/219,502, filed on Dec. 13, 2018, now Pat. No. 10,791,282.

(51) Int. Cl.
*H04N 5/235* (2006.01)
*H04N 5/341* (2011.01)
(Continued)

(52) U.S. Cl.
CPC ......... *H04N 5/2355* (2013.01); *H04N 5/2353* (2013.01); *H04N 5/341* (2013.01);
(Continued)

(58) Field of Classification Search
CPC .... H04N 5/2355; H04N 5/2353; H04N 5/341; H04N 5/353; H04N 5/35572;
(Continued)

(56) References Cited

U.S. PATENT DOCUMENTS 5,016,282 A    5/1991  Tomono et al.
5,564,417 A   10/1996  Chance
(Continued)

FOREIGN PATENT DOCUMENTS

WO    WO 2013/066634 A1    5/2013

OTHER PUBLICATIONS

United States Office Action, U.S. Appl. No. 16/748,510, dated May 27, 2021, 12 pages.
(Continued)

*Primary Examiner* — Abdelaaziz Tissire
(74) *Attorney, Agent, or Firm* — Fenwick & West LLP

(57) ABSTRACT

A camera assembly for generating high dynamic range images. The camera assembly includes a sensor that images a portion of a local area, and a controller. The sensor includes a plurality of augmented pixels, each augmented pixel having a plurality of gates and at least some of the gates have a respective local storage location. An exposure interval of each augmented pixel is divided into intervals associated with the gates, and each local storage location stores image data during a respective interval. The controller reads out, after the exposure interval of each augmented pixel, the image data stored in the respective local storage locations of each augmented pixel to form intermediate images that each have a dynamic range. The controller then generates an image for the portion of the local area using the intermediate images, the image having a higher dynamic range than each of the intermediate images.

20 Claims, 19 Drawing Sheets

(51) Int. Cl.
  *G02B 27/00* (2006.01)
  *G02B 27/01* (2006.01)
(52) U.S. Cl.
  CPC .. *G02B 27/0172* (2013.01); *G02B 2027/0138* (2013.01); *G02B 2027/0178* (2013.01)
(58) Field of Classification Search
  CPC .... H04N 5/37452; H04N 5/374; H04N 5/357; G02B 27/0172; G02B 2027/0138; G02B 2027/0178; H01L 27/14656; H01L 27/14643; H01L 27/14634
  See application file for complete search history.

(56) References Cited

U.S. PATENT DOCUMENTS

| | | | |
|---|---|---|---|
| 8,311,286 B2 | 11/2012 | Masuda et al. | |
| 8,569,671 B2 | 10/2013 | Meynants et al. | |
| 8,824,779 B1 | 9/2014 | Smyth | |
| 9,127,942 B1 | 9/2015 | Haskin et al. | |
| 9,555,589 B1 | 1/2017 | Ambur et al. | |
| 9,581,744 B1 | 2/2017 | Yun et al. | |
| 9,581,827 B1 | 2/2017 | Wong et al. | |
| 9,737,209 B2 | 8/2017 | Gramatikov et al. | |
| 9,829,710 B1 | 11/2017 | Newell et al. | |
| 9,835,777 B2 | 12/2017 | Ouderkirk et al. | |
| 10,108,261 B1 | 10/2018 | Hall et al. | |
| 10,146,055 B2 | 12/2018 | Ouderkirk | |
| 10,229,943 B2 | 3/2019 | Genov et al. | |
| 10,791,282 B2* | 9/2020 | Li | H04N 5/2355 |
| 10,902,623 B1 | 1/2021 | Li et al. | |
| 2006/0239558 A1 | 10/2006 | Rafii et al. | |
| 2007/0058038 A1* | 3/2007 | David | G01S 7/483 348/135 |
| 2007/0091175 A1 | 4/2007 | Iddan et al. | |
| 2007/0146682 A1 | 6/2007 | Tachino et al. | |
| 2009/0021621 A1* | 1/2009 | Hashimoto | H04N 5/3456 348/300 |
| 2009/0135263 A1* | 5/2009 | Sorek | H04N 5/35581 348/222.1 |
| 2010/0188491 A1 | 7/2010 | Shizukuishi | |
| 2011/0050885 A1 | 3/2011 | McEldowney | |
| 2011/0090385 A1* | 4/2011 | Aoyama | H01L 27/14603 348/308 |
| 2011/0134298 A1* | 6/2011 | Aoyama | H04N 5/37452 257/431 |
| 2012/0075432 A1 | 3/2012 | Bilbrey et al. | |
| 2012/0082346 A1 | 4/2012 | Katz et al. | |
| 2012/0154467 A1 | 6/2012 | Hwang et al. | |
| 2012/0274744 A1 | 11/2012 | Wan et al. | |
| 2012/0314124 A1* | 12/2012 | Kaizu | H04N 5/2353 348/E5.037 |
| 2012/0320219 A1 | 12/2012 | David et al. | |
| 2013/0135486 A1* | 5/2013 | Wan | H04N 5/772 348/207.99 |
| 2013/0181119 A1 | 7/2013 | Bikumandla et al. | |
| 2014/0118397 A1 | 5/2014 | Lee et al. | |
| 2014/0285429 A1 | 9/2014 | Simmons | |
| 2015/0193920 A1 | 7/2015 | Knee et al. | |
| 2016/0065866 A1 | 3/2016 | Hsu | |
| 2016/0086379 A1 | 3/2016 | Sadi et al. | |
| 2016/0127715 A1 | 5/2016 | Shotton et al. | |
| 2016/0147408 A1 | 5/2016 | Bevis et al. | |
| 2016/0202484 A1 | 7/2016 | Ouderkirk | |
| 2016/0225154 A1 | 8/2016 | Zhou et al. | |
| 2016/0324580 A1 | 11/2016 | Esterberg | |
| 2016/0334508 A1 | 11/2016 | Hall et al. | |
| 2016/0344965 A1 | 11/2016 | Grauer et al. | |
| 2016/0373672 A1 | 12/2016 | Liu | |
| 2017/0065240 A1 | 3/2017 | Zou et al. | |
| 2017/0115393 A1* | 4/2017 | Nagai | G01S 17/10 |
| 2017/0115395 A1 | 4/2017 | Grauer et al. | |
| 2017/0180703 A1 | 6/2017 | Kovacovsky et al. | |
| 2017/0180713 A1 | 6/2017 | Trail | |
| 2017/0192499 A1 | 7/2017 | Trail | |
| 2017/0195653 A1 | 7/2017 | Trail et al. | |
| 2017/0206660 A1 | 7/2017 | Trail | |
| 2017/0276789 A1 | 9/2017 | Ikeno et al. | |
| 2017/0323455 A1 | 11/2017 | Bittan et al. | |
| 2018/0038944 A1 | 2/2018 | Hellmig et al. | |
| 2018/0063390 A1 | 3/2018 | Trail | |
| 2018/0063442 A1* | 3/2018 | Mäkelä et al. | H04N 5/35572 |
| 2018/0100731 A1 | 4/2018 | Pau | |
| 2018/0102386 A1* | 4/2018 | Kobayashi | H04N 5/3559 |
| 2018/0124299 A1* | 5/2018 | Brook | H04N 5/23222 |
| 2018/0124372 A1 | 5/2018 | Yang et al. | |
| 2018/0135980 A1 | 5/2018 | Nakamura et al. | |
| 2018/0143302 A1 | 5/2018 | Osiroff et al. | |
| 2018/0196509 A1 | 7/2018 | Trail | |
| 2018/0227567 A1 | 8/2018 | Chao et al. | |
| 2018/0239146 A1 | 8/2018 | Bierhuizen et al. | |
| 2018/0278910 A1 | 9/2018 | Schoenberg et al. | |
| 2018/0288343 A1 | 10/2018 | McCarten et al. | |
| 2018/0299554 A1 | 10/2018 | Van Dyck et al. | |
| 2018/0376090 A1* | 12/2018 | Liu | H04N 5/3745 |
| 2019/0033070 A1 | 1/2019 | Murakami | |
| 2019/0162852 A1 | 5/2019 | Kim et al. | |
| 2019/0181171 A1 | 6/2019 | Tadmor et al. | |
| 2019/0342485 A1* | 11/2019 | Lee | H04N 5/2355 |
| 2019/0361123 A1 | 11/2019 | Miyazaki | |
| 2020/0096640 A1 | 3/2020 | Atanassov et al. | |
| 2020/0259989 A1 | 8/2020 | Li et al. | |
| 2020/0260021 A1 | 8/2020 | Li et al. | |

OTHER PUBLICATIONS

Kadambi, A et al., "Polarized 3D: High-Quality Depth Sensing with Polarization Cues," The IEEE International Conference on Computer Vision (ICCV), 2015, pp. 3370-3378.
PCT International Search Report and Written Opinion, PCT Application No. PCT/US2018/040771, dated Nov. 16, 2018, 20 pages.
Yahav, G et al., "A Low Cost 3D Tracker for Parallax Barrier Display," 2007 3DTV Conference, May 2007, pp. 1-4.
Holloway, J et al. "Flutter Shutter Video Camera for Compressive Sensing of Videos." 2012 IEEE International Conference on Computational Photography (ICCP), Apr. 28-29, 2012, pp. 1-9.
Raskar, R et al. "Coded Exposure Photography: Motion Deblurring using Fluttered Shutter." SIGGRAPH '06: ACM SIGGRAPH 2006, Jul. 2006, DD. 795-804.
United States Office Action, U.S. Appl. No. 16/219,502, dated Apr. 2, 2020, 18 pages.
United States Office Action, U.S. Appl. No. 16/219,511, dated May 12, 2020, 14 pages.

* cited by examiner

1400

```
┌─────────────────────────────────────────────────────────────────────┐
│                                                                     │
│         Image, via a sensor, at least a portion of a local area     │
│                                  1410                               │
│                                                                     │
└─────────────────────────────────────────────────────────────────────┘
                                    │
                                    ▼
┌─────────────────────────────────────────────────────────────────────┐
│  Determine, for each augmented pixel of the sensor, a difference    │
│  between first image data stored in a first local storage location  │
│  of that augmented pixel and second image data stored in a second   │
│            local storage location of that augmented pixel           │
│                                  1420                               │
└─────────────────────────────────────────────────────────────────────┘
```

FIG. 14

HIGH DYNAMIC RANGE CAMERA ASSEMBLY WITH AUGMENTED PIXELS

CROSS REFERENCE TO RELATED APPLICATIONS

This application is a continuation of co-pending U.S. application Ser. No. 16/219,502, filed Dec. 13, 2018, which is incorporated by reference in its entirety.

BACKGROUND

The present disclosure generally relates to a camera assembly, and specifically relates to a high dynamic range camera assembly with augmented pixels.

To achieve compelling user experience in artificial reality systems, it is essential to rely on an accurate and efficient camera for sensing a two-dimensional (2D) and three-dimensional (3D) surrounding environment.

Imaging systems with a large high dynamic range (HDR) facilitate 2D imaging of scenes that have a broad spectrum of brightness values. Typically, a number of image frames with different exposures are captured to generate one HDR image. However, this conventional approach features a long latency as the camera needs to read out multiple frames with different exposures. This approach may also feature a motion blur when capturing fast moving objects.

For achieving compelling 3D user experience of the surrounding environment in artificial reality systems, it is challenging to design a depth camera having a high performance and low computational power, which is also robust to the environment, flexible to operate, and have a compact form factor. Moreover, conventional methods for depth sensing typically involve either a triangulation or time of flight based depth determination, and have several drawbacks. For example, the triangulation based methods generally have a high computational cost to generate a depth map that involves rectification and searching for corresponding points using a pair of stereo images. The depth resolution achieved with the triangulation-based methods also relies on a baseline (e.g., distance between source and camera), and a size of the baseline increases with increasing depth. The time-of-flight methods for depth sensing experience a limited lateral resolution due to a limited number of pixels in conventional sensors. Also, the time-of-flight methods for depth sensing feature motion blur when capturing moving objects due to a relatively high number of image frames required to estimate the depth.

SUMMARY

A camera assembly presented herein generates high dynamic range images. The camera assembly includes a sensor and a controller. The sensor is configured to image at least a portion of a local area. The sensor includes a plurality of augmented pixels. Each augmented pixel has a plurality of gates and at least some of the gates have a respective local storage location. An exposure interval of each augmented pixel is divided into intervals that are associated with the gates, and each local storage location stores image data during a respective interval. The controller is configured to read out, after the exposure interval of each augmented pixel, the image data stored in the respective local storage locations of each augmented pixel to form a plurality of intermediate images that each have a dynamic range. The controller then generates an image for the portion of the local area using the plurality of intermediate images, wherein the image has a higher dynamic range than each of the intermediate images.

In some embodiments, the camera assembly is integrated into a headset. The headset may be, e.g., a near-eye display (NED), a head-mounted display (HMD), or some other type of headset. The headset further includes a display and an optical assembly. The headset may be part of an artificial reality system. The display of the headset is configured to emit image light. The optical assembly of the headset is configured to direct the image light to an eye box of the headset corresponding to a location of a user's eye. The image light may comprise the image for the portion of the local area determined by the camera assembly.

BRIEF DESCRIPTION OF THE DRAWINGS

FIG. 14 is a flow chart illustrating a process of generating differential images for a local area, in accordance with one or more embodiments.

Figure 1:
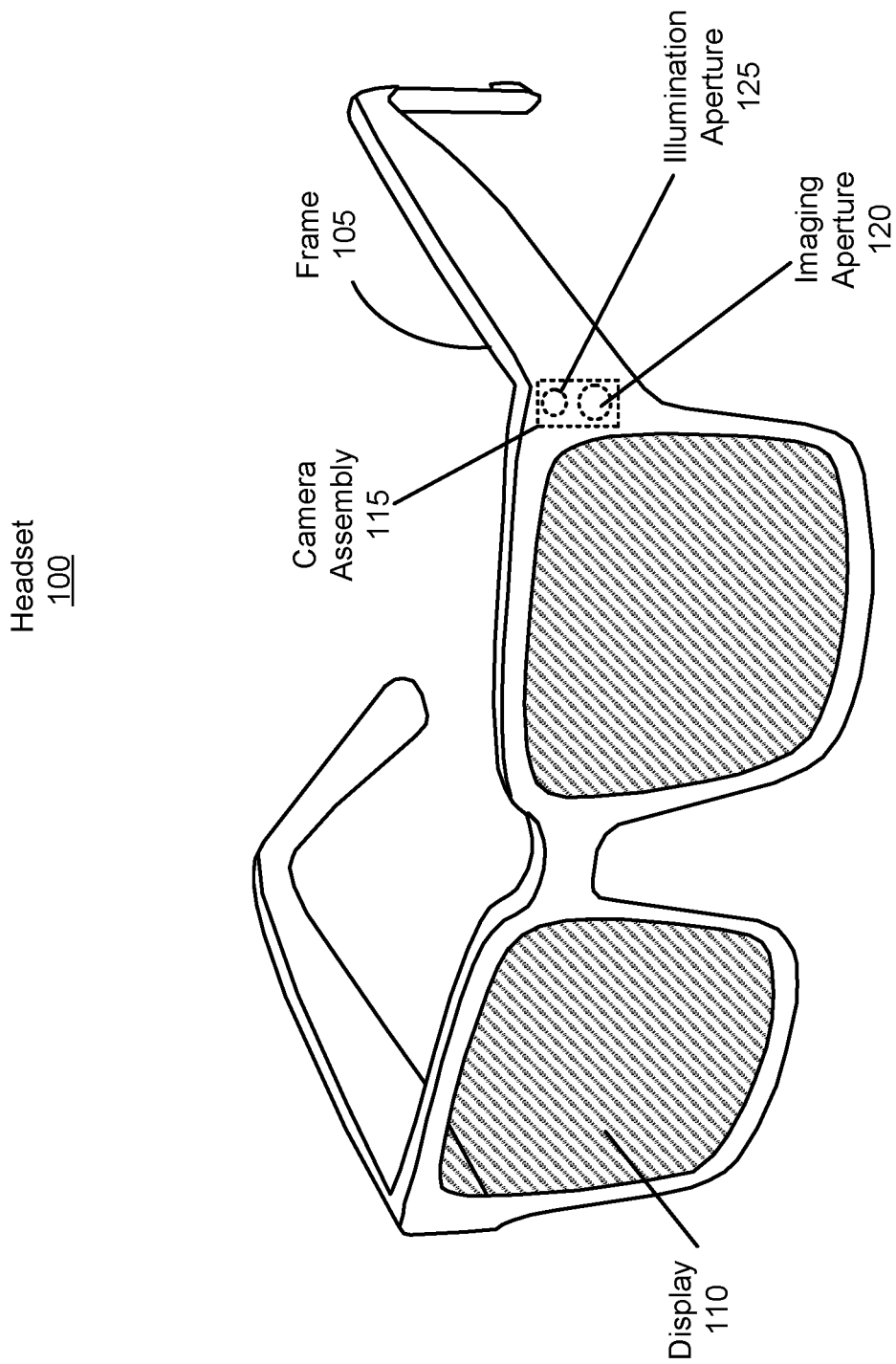
FIG. 1 is a diagram of a headset, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

Some embodiments of the present disclosure relate to a camera assembly configured to generate high dynamic range images of a local area surrounding the camera assembly. The camera assembly includes a sensor having augmented pixels. Each augmented pixel has a plurality of gates and a plurality of associated local storage locations. The camera assembly controls the gates such that gates can have different exposure times. The camera assembly images the local area over a time period. During the time period the camera assembly instructs the augmented pixels to cycle through different gates such that over the time period a plurality of exposures are stored in the local storage locations associated with their respective gates. The camera assembly then reads out the data from the local storage locations of the augmented pixels to form a plurality of intermediate images. The camera generates a high dynamic range image using at least some of the intermediate images.

Some other embodiments of the present disclosure relate to a camera assembly configured as a depth camera assembly (DCA) to determine depth information using, e.g., time-of-flight based depth sensing techniques. The DCA includes a source assembly and a camera assembly. The source assembly includes a light source (e.g., a pulsed laser) that emits pulse light. The camera assembly includes a sensor that includes augmented pixels that have a plurality of gates (e.g., 3 or 4 gates) and a plurality of associated local storage locations. The camera assembly is configured to image a local area over a time period in sync with pulsed light from the source assembly. During the time period the DCA instructs the augmented pixels to cycle through different gates such that over the time period a plurality of exposures are stored in local storage areas associated with their respective gates. The DCA then reads out the data from the local storage areas of the augmented pixels to form a plurality of intermediate images. The DCA uses the intermediate images to determine depth information for the local area. The DCA may operate in multiple modes, e.g., continuous wave phasor, pulsed phasor, etc. Additionally, in some embodiments, the DCA is configured to adjust the number of repeating cycles on a per augmented pixel basis to control exposure of each of the augmented pixels.

Some other embodiments of the present disclosure relate to a camera assembly configured to generate differentiated images of a local area. The camera assembly includes a sensor that includes augmented pixels that have two gates, and for each gate an associated local storage location, e.g., a first storage location and a second storage location. The camera assembly images the local area over a time period. During the time period the augmented pixels cycle through different gates such that a plurality of exposures are stored in the first storage location and the second storage location. The camera assembly then determines, for each augmented pixel, a difference between the data in the data stored in the first local storage location and the second local storage location. The camera reads out the difference as a differential image of the local area.

The camera assembly presented herein may be integrated into a headset. The headset may be, e.g., a NED, a HMD, or some other type of headset. The headset may be part of an artificial reality system. The headset further includes a display and an optical assembly. The display of the headset is configured to emit image light. The optical assembly of the headset is configured to direct the image light to an eye box of the headset corresponding to a location of a user's eye. In some embodiments, the image light may include depth information for a local area surrounding the headset determined by the camera assembly.

FIG. 1 is a diagram of a headset 100, in accordance with one or more embodiments. The headset 100 presents media to a user. Examples of media presented by the headset 100 include one or more images, video, audio, or some combination thereof. In some embodiments, audio is presented via an external device (e.g., speakers and/or headphones) that receives audio information from the headset 100, a console (not shown), or both, and presents audio data based on the audio information. As shown in FIG. 1, the headset 100 is a NED, but in embodiments not shown, the headset may be a HMD, or some other headset. The headset 100 may be part of an artificial reality system (not shown). The headset 100 is generally configured to operate as an artificial reality headset. In some embodiments, the headset 100 may augment views of a physical, real-world environment with computer-generated elements (e.g., images, video, sound, etc.).

The headset 100 shown in FIG. 1 includes a frame 105 and a display 110. The frame 105 includes one or more optical elements which together display media to users. The display 110 is configured for users to see the content presented by the headset 100. The display 110 generates an image light to present media to an eye of the user.

The headset 100 further includes a camera assembly 115 configured to image a portion of a local area surrounding some or all of the headset 100. In some embodiments, the camera assembly 115 is implemented as a DCA configured to determine depth information for the local area. The headset 100 also includes an imaging aperture 120, and an imaging device of the camera assembly 115 captures ambient light coming from the local area through the imaging aperture 120. In some embodiments, e.g., when the camera assembly 115 is implemented as a DCA, the camera assembly 115 further includes an illumination aperture 125, and a light source assembly of the camera assembly 115 emits light (e.g., polarized light, structured light, etc.) through the illumination aperture 125. The imaging device of the camera assembly 115 captures light from the light source assembly that is reflected from the local area through the imaging aperture 120. Light emitted from the light source assembly of the camera assembly 115 through the illumination aperture 125 may comprise pulses of light.

Position of the camera assembly 115 within the headset 100 shown in FIG. 1 is only illustrative, and the camera assembly 115 can be located elsewhere on the frame 105, e.g., on any temple of the frame 105. Also, components of the camera assembly 115 can be located on different locations of the frame 105, e.g., the light source assembly and the illumination aperture 125 can be located on one temple of the frame 105 whereas the imaging device and the imaging aperture 120 can be located on another temple of the frame 105. The headset 100 shown in FIG. 1 is only an example of an artificial reality system. In alternate embodiments (not shown in FIG. 1), the camera assembly 115 could be part of an artificial reality system that includes a HMD, e.g., the camera assembly 115 can be integrated into the HMD.

In one embodiment, the camera assembly 115 presented in this disclosure provides generated images and/or the determined depth information to a console coupled to the headset 100. The console is then configured to generate content for presentation on an electronic display of the headset 100, based on the images and/or the depth information. In another embodiment, the camera assembly 115 presented herein provides the generated images and/or the determined depth information to a module of the headset 100 that generates content for presentation on the electronic display of the headset 100, based on the images and/or the depth information. In an alternate embodiment, the camera assembly 115 is integrated into the headset 100 as part of an AR system. In this case, the headset 100 may be configured to sense and display objects behind a head of a user wearing the headset 100 or display objects recorded previously. In yet other embodiment, the camera assembly 115 is integrated into a base station or a sensor bar external to the headset 100. In this case, the camera assembly 115 may be configured to sense various body parts of a user wearing the headset 100, e.g., the user's lower body. In yet other embodiment, the camera assembly 115 is configured as part of a controller or as part of a capture system to capture VR content, AR content, and/or MR content.

In some embodiments, the camera assembly 115 presented herein and mounted on the headset 100 (or integrated into a frame of the headset 100) can be configured for hand tracking of a user wearing the headset 100. In other embodiments, the camera assembly 115 presented herein is configured to generate a hand gesture recognition input. In yet other embodiments, the camera assembly 115 presented herein is configured to determine object occlusion information, which may be displayed on the display 110. In yet other embodiments, the camera assembly 115 presented herein is configured for depth reconstruction. Alternatively, the camera assembly 115 presented herein can be part of a device external to the headset 100, and can be configured for recording the geometry of a user or a local area, hand-tracking, eye-tracking, etc.

Figure 2:
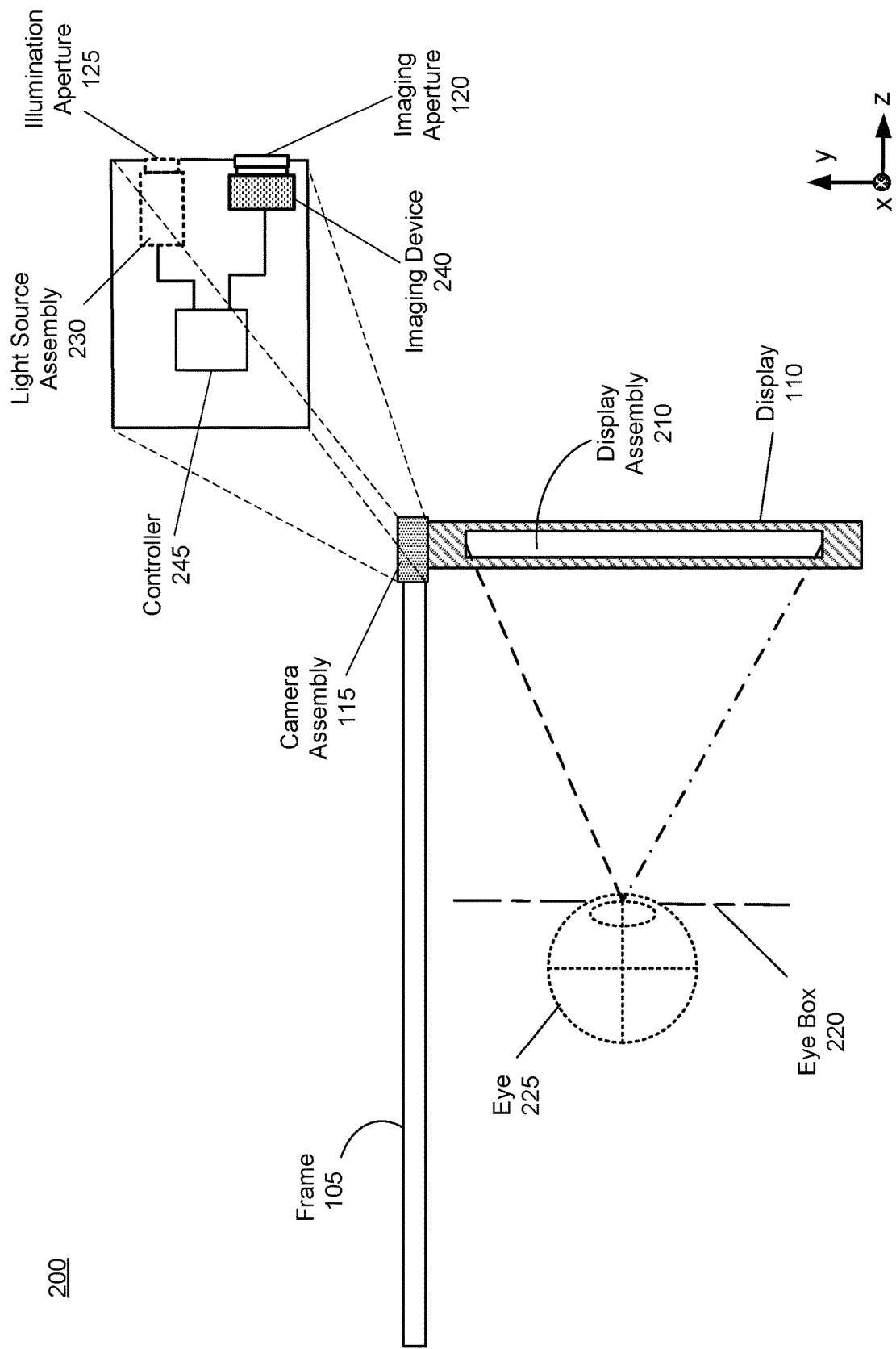
FIG. 2 is a cross-section of the headset in FIG. 1, in accordance with one or more embodiments.

FIG. 2 is a cross section 200 of the headset 100 illustrated in FIG. 1, in accordance with one or more embodiments. The cross section 200 includes at least one display assembly 210 integrated into the display 110, and the camera assembly 115. An eye box 220 is a location where an eye 225 is positioned when a user wears the headset 100. In some embodiments, the frame 105 may represent a frame of eye-wear glasses. For purposes of illustration, FIG. 2 shows the cross section 200 associated with a single eye 225 and a single display assembly 210, but in alternative embodiments not shown, another display assembly which is separate from the display assembly 210 shown in FIG. 2, provides image light to another eye 225 of the user.

The display assembly 210 is configured to direct the image light to the eye 225 through the eye box 220. In some embodiments, when the headset 100 is configured as an AR headset, the display assembly 210 also directs light from a local area surrounding the headset 100 to the eye 225 through the eye box 220. The display assembly 210 may be configured to emit image light at a particular focal distance in accordance with varifocal instructions, e.g., provided from a varifocal module (not shown in FIG. 2).

The display assembly 210 may be composed of one or more materials (e.g., plastic, glass, etc.) with one or more refractive indices that effectively minimize the weight and present to the user a field of view of the headset 100. In alternate configurations, the headset 100 includes one or more optical elements between the display assembly 210 and the eye 225. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210.

The camera assembly 115 mounted on the frame 105 includes an imaging device 240 and a controller 245 coupled to the imaging device 240. In some embodiments, e.g., the camera assembly 115 is implemented as a DCA, and the camera assembly 115 further includes a light source assembly 230 that is coupled to the controller 245. In alternative embodiments (not shown in FIG. 2), the light source assembly 230 and the imaging device 240 each may include its own internal controller. In some embodiments (not shown in FIG. 2), the light source assembly 230 and the imaging device 240 can be separated, e.g., the light source assembly 230 and the imaging device 240 can be located in different assemblies.

The light source assembly 230 may illuminate the local area with light in accordance with emission instructions generated by the controller 245. The light source assembly 230 may be configured to project pulses of light into the local area, e.g., through the illumination aperture 120. The light source assembly 230 may include a plurality of light sources, e.g., a two-dimensional array of light sources. Examples of light sources include but are not limited to:

light-emitting diodes (LEDs), micro light-emitting diodes (μLEDs), micro super luminescent diodes (μSLDs), vertical-cavity surface-emitting lasers (VCSELs), micro resonant cavity light-emitting diodes (μRCLEDs), some other light source that emits light, or some combination thereof. Alternatively, the light source assembly 230 includes a single light source emitting the pulses of light. In some embodiments, the light source assembly 230 includes projection optics that in-couples light from one or more sources of the light source assembly 230 and projects the light over at least a portion of the local area. The light source assembly 230 may be able to emit light in different bands. Furthermore, the light source assembly 230 may be configured to emit different patterns of light, e.g., structured light, diffuse flash, etc. The timing of light source assembly 230 being activated to emit light can be controlled based on, e.g., emission instructions from the controller 245.

The imaging device 240 is configured to image at least a portion of the local area. The imaging device 240 may be configured to operate with a frame rate in the range of approximately 30 Hz to approximately 1 KHz for fast detection of objects in the local area. The imaging device 240 includes a sensor (not shown in FIG. 2) having a plurality of augmented pixels for capturing light coming from the local area, e.g., through the imaging aperture 120. In some embodiments, the light captured by the augmented pixels of the imaging device 240 is ambient light. In some embodiments, the light captured by the augmented pixels of the imaging device 240 is light emitted by the light source assembly 230 and reflected from the local area. Each augmented pixel includes a plurality of gates, and at least some of the gates have a respective local storage location. An exposure interval of each augmented pixel may be divided into intervals and some of the intervals are synchronized to the pulses of light projected by the light source assembly 230 such that each respective local storage location of each augmented pixel stores image data during a respective interval. The sensor comprising the augmented pixels is described in more detail in conjunction with FIGS. 3A-3B. In some embodiments, e.g., when the camera assembly 115 is implemented as a DCA, the imaging device 240 includes one or more filters (e.g., an infrared filter) for blocking at least portion of ambient light from reaching the sensor of the imaging device 240. The imaging device 240 may be sensitive to different bands of light, e.g., infrared light including one or more bands between 700 nm and 1 mm.

The controller 245 may generate the emission instructions and provide the emission instructions to the light source assembly 230 for controlling operation of each individual light source in the light source assembly 230. The controller 245 may also generate capture instructions and provide the capture instructions to the imaging device 240 to control timing of the intervals during which respective local storage locations of each augmented pixel in the sensor element of the imaging device 240 stores image data. The controller 245 may generate images for the local area and/or depth information for the local area based in part on the image data stored in the respective local storage locations of each augmented pixel in the sensor of the imaging device 240, as described in detail in conjunction with FIG. 5, FIG. 12, and FIG. 14. The controller 245 may provide the images and/or the depth information to a console (not shown in FIG. 2) and/or an appropriate module of the headset 100 (e.g., a varifocal module, not shown in FIG. 2). The console and/or the headset 100 may utilize the images and/or the depth information to, e.g., generate content for presentation on the display 110.

In some embodiments, the headset 100 further includes an eye tracker (not shown in FIG. 2) for determining and tracking a position of the eye 225, i.e., an angle and orientation of eye-gaze. Note that information about the position of the eye 225 also includes information about an orientation of the eye 225, i.e., information about user's eye-gaze. Based on the determined and tracked position and orientation of the eye 225, the headset 100 adjusts image light emitted from the display assembly 210. In some embodiments, the headset 100 adjusts focus of the image light and ensures that the image light is in focus at the determined angle of eye-gaze in order to mitigate the vergence-accommodation conflict. Additionally or alternatively, the headset 100 adjusts resolution of the image light by performing foveated rendering of the image light, based on the position of the eye 225. Additionally or alternatively, the headset 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 210. In alternate embodiments, components of the eye tracker are integrated into the frame 105.

Figure 3A:
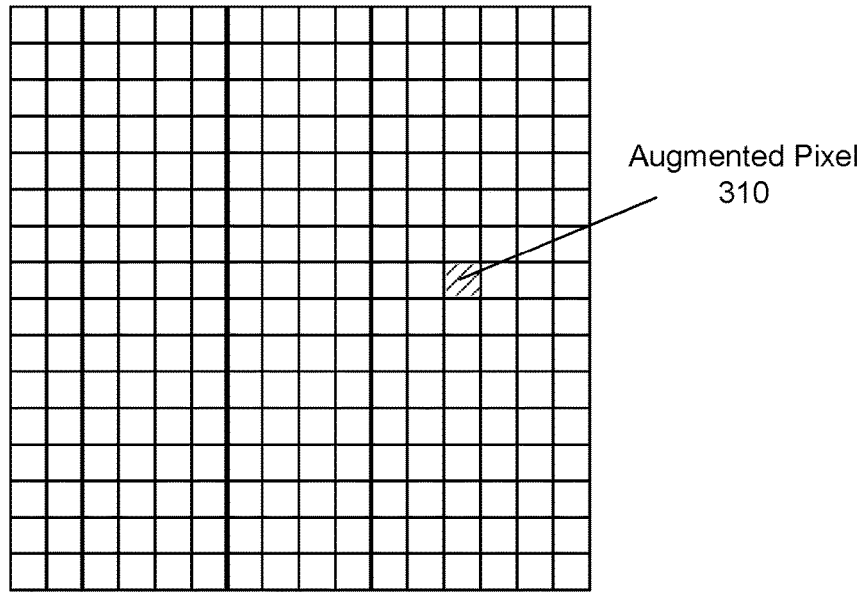
FIG. 3A is an example sensor having a plurality of augmented pixels, in accordance with one or more embodiments.

FIG. 3A is an example sensor 300 having a plurality of augmented pixels 310, in accordance with one or more embodiments. The sensor 300 may be part of the camera assembly 115, e.g., the sensor 300 may be integrated into the imaging device 240 of the camera assembly 115 shown in FIG. 2. Alternatively, the sensor 300 may be implemented as part of some other camera assembly. The sensor 300 may capture, via the augmented pixels 310, light from a local area surrounding some or all of the headset 100. The light captured by the augmented pixels 310 of the sensor 300 may originate from light emitted by the light source assembly 230 of the camera assembly 115 and reflected from one or more objects in the local area, may originate from light emitted by some other light source (e.g., of the headset 100) and reflected from the local area, may originate from ambient light of the local area, or some combination thereof. The augmented pixels 310 may be organized within the sensor 300 as a two-dimensional array of augmented pixels 310. While the sensor 300 illustrated in FIG. 3A is 16×16 sensor, in other embodiments the sensor 300 may have some other number of columns and/or rows. For example, the sensor 300 may be 3000×4000. The sensor 300 can be generally described as an N×M sensor having N rows of augmented pixels 310 and M columns of augmented pixels 310.

Figure 3B:
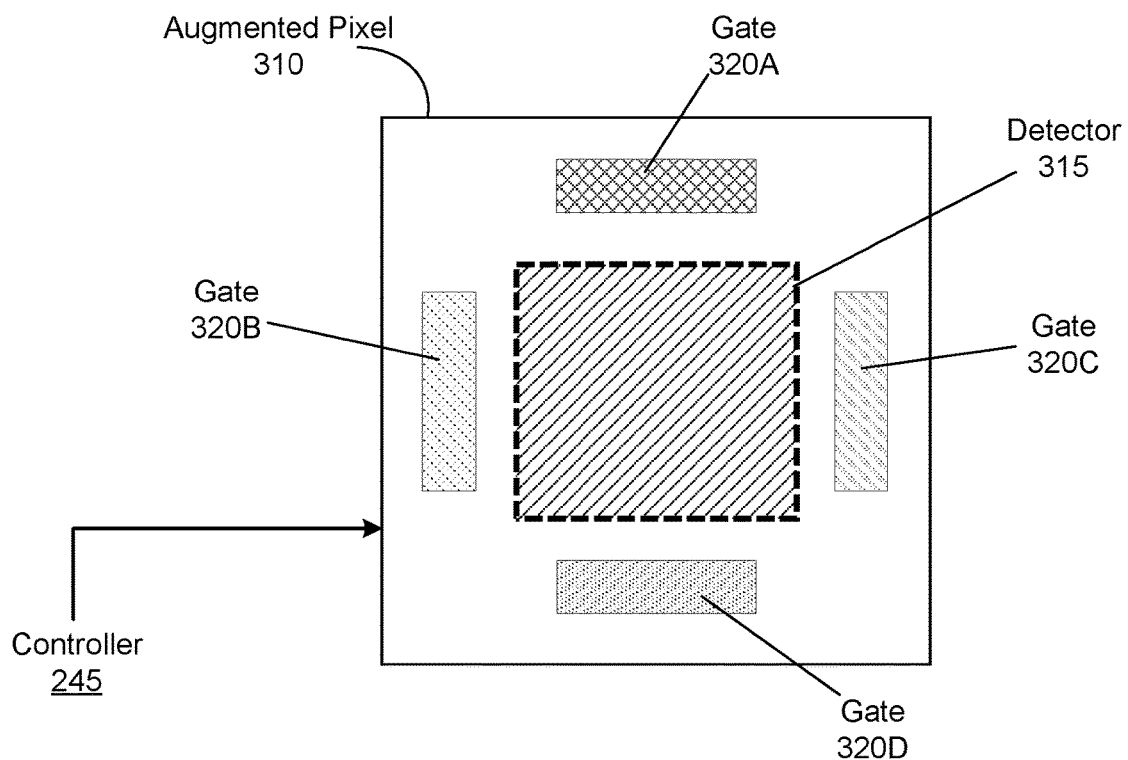
FIG. 3B is an example augmented pixel of the sensor in FIG. 3A, in accordance with one or more embodiments.

FIG. 3B is an example augmented pixel 310 of the sensor 300 in FIG. 3A, in accordance with one or more embodiments. The augmented pixel 310 captures, over multiple time intervals, intensities of light incident on a surface of the augmented pixel 310. The augmented pixel 310 includes a detector 315 and a plurality of gates, e.g., gates 320A, 320B, 320C, and 320D as shown in FIG. 3B. Although the augmented pixel 310 shown in FIG. 3B includes three gates, each augmented pixel 310 of the sensor 300 may include less than three gates (e.g., two gates) or more than three gates (e.g., four or five gates). In some embodiments, different augmented pixels of the sensor 300 have different numbers of gates and/or storage areas associated with the gates.

The detector 315 represents a photo-sensitive area of the augmented pixel 310. The detector 315 in-couples, e.g., through an aperture, photons of incident light and transforms the captured photons into electrons (charge). An appropriate electric field generated at a specific time interval based on, e.g., capture instructions from the controller 245, guides the charge from the detector 315 to a local storage location associated with a specific gate, e.g., the gate 320A, 320B, or 320C or to a ground that may be coupled to the gate 320D.

Some or all of the gates 320A, 320B, 320C, 320D have a respective local storage location for storing a charge related to light captured by the detector 315 at a specific time interval. For example, the gates 320A, 320B, 320C may all have different respective local storage locations. Each gate 320A, 320B, 320C, 320D functions as a switch that is biased to either pass or not pass the charge collected at the detector 315 to, e.g., a local storage area associated with the gate or a drain (e.g., ground). In some embodiments, at least one of the gates 320A, 320B, 320C, 320D operates as a drain gate and does not have a local storage location, and instead drops a charge (e.g., via a ground) received from the detector 315 while active. For example, the gate 320D may be implemented as a drain.

The respective local storage location of each gate 320A, 320B, 320C may be implemented as an analog electron storage area (e.g., a capacitor) for storing an analog charge generated from the light captured by the detector 315. In some embodiments, the respective local storage location of each gate 320A, 320B, 320C may be coupled to an analog-to-digital converter for converting the analog charge into digital information (i.e., a digital value quantifying an amount of analog charge). Note that in a single augmented pixel 310 there is a plurality of local storage locations that are each associated with a respective gate, and the local storage locations are all local to the single augmented pixel 310 and do not belong to any other augmented pixels 310. Thus, the local storage locations are associated with the particular augmented pixel 310, and they do not represent e.g., a memory bank separate from the sensor 300.

High-Dynamic Range Imaging

Figure 4:
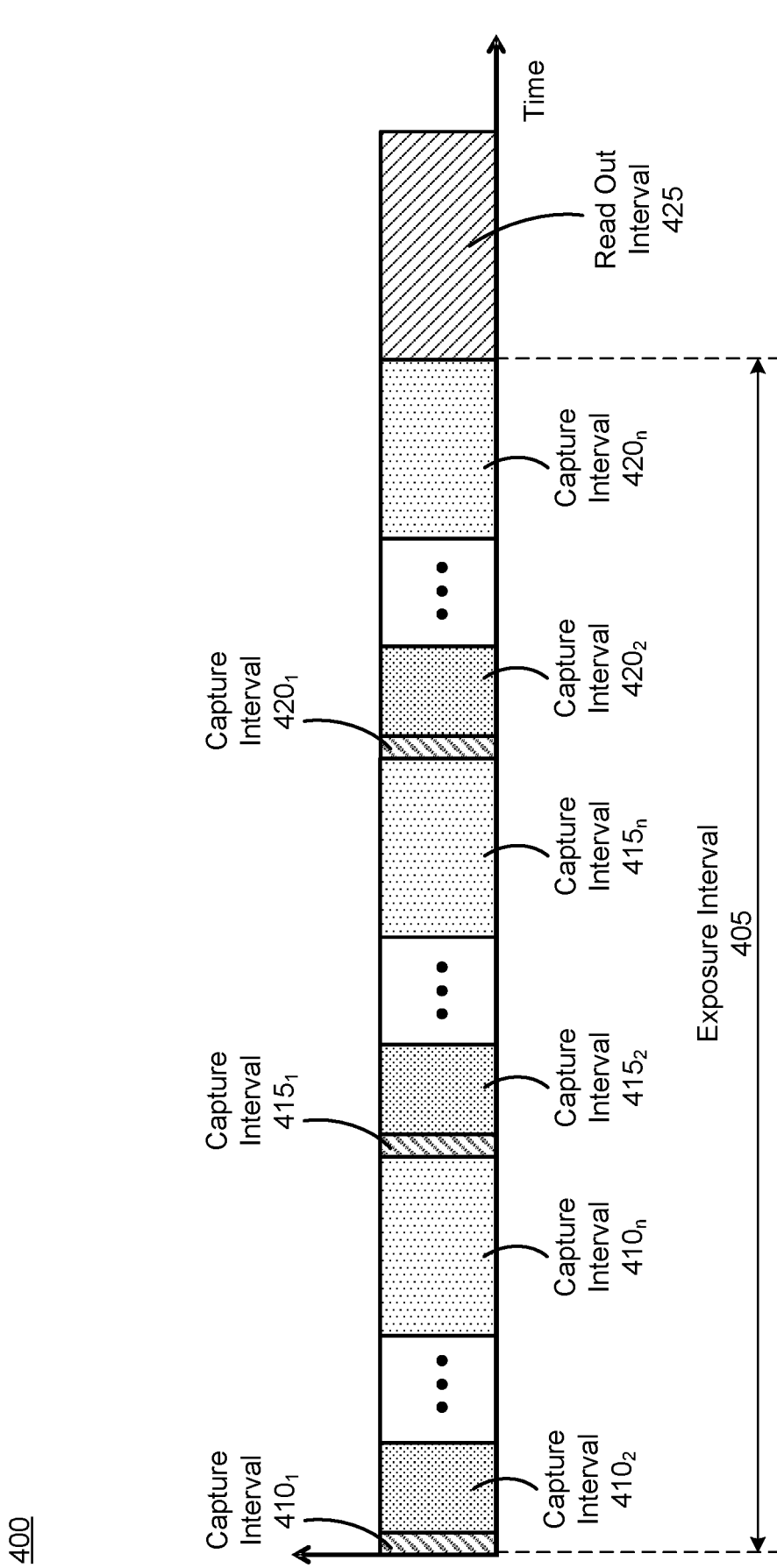
FIG. 4 is an example pixel timing diagram for high-dynamic range imaging, in accordance with one or more embodiments.

FIG. 4 is an example pixel timing diagram 400 for high-dynamic range imaging, in accordance with one or more embodiments. The pixel timing diagram 400 relates to an embodiment for operating an augmented pixel of a camera assembly (e.g., the augmented pixel 310 of the camera assembly 115) for generating a high dynamic range image of a local area. The augmented pixel 310 may operate in accordance with the pixel timing diagram 400 based on, e.g., capture instructions from the controller 245. The augmented pixel 310 may include n gates each having a respective local storage location, where n>2. The augmented pixel 310 may be configured to image, over an exposure interval 405, at least a portion of the local area. The exposure interval 405 may be divided into capture intervals, e.g., capture intervals $410_1$, $410_2$, ..., $410_n$, $415_1$, $415_2$, ..., $415_n$, $420_1$, $420_2$, ..., $420_n$, as shown in FIG. 4. During each capture interval, a corresponding gate is activated to enable an associated local storage location to store image data (i.e., a charge) associated with light captured by the detector 315 during that capture interval. Note that FIG. 4 is only the illustrative example, and either more or less capture intervals may be associated with each gate of the augmented pixel 310.

In some embodiments, the augmented pixel 310 includes three gates 320A, 320B, 320C each having a respective local storage location (i.e., n=3). The capture intervals $410_1$, $415_1$, $420_1$ may be associated with a first of the plurality of gates of the augmented pixel 310 (e.g., the gate 320A); the capture intervals $410_2$, $415_2$, $420_2$ may be associated with a second of the plurality of gates of the augmented pixel 310 (e.g., the gate 320B); and as n=3 the capture intervals $410_n$, $415_n$, $420_n$ may be associated with a third of the plurality of gates of the augmented pixel 310 (e.g., the gate 320C). Thus, during the capture intervals $410_1$, $415_1$, $420_1$, one of the gates 320A, 320B, 320C (e.g., the gate 320A) may be activated to enable an associated local storage location to store image data (i.e., intensities of light) captured by the detector 315, and the other gates (e.g., all but 320A) are inactive during the capture intervals $410_1$, $415_1$, $420_1$. Similarly, during the capture intervals $410_2$, $415_2$, $420_2$, one of the gates 320A, 320B, 320C (e.g., the gate 320B) may be activated to enable an associated local storage location to store image data (i.e., intensities of light) captured by the detector 315, and the other gates (e.g., all but 320B) are inactive during the capture intervals $410_2$, $415_2$, $420_2$. Similarly, during the capture intervals $410_3$, $415_3$, $420_3$, one of the gates 320A, 320B, 320C (e.g., the gate 320C) may be activated to enable an associated local storage location to store image data (i.e., intensities of light) captured by the detector 315, and the other gates (e.g., all but 320C) are inactive during the capture intervals $410_3$, $415_3$, $420_3$.

As shown in FIG. 4, a duration of each capture interval $410_1$, $415_1$, $420_1$ associated with the first gate is different than a duration of each capture interval $410_2$, $415_2$, $420_2$ associated with the second gate, which is also different than a duration of each capture interval $410_3$, $415_3$, $420_3$ associated with the third gate, and so on. Thus, a duration of each capture interval $410_i$, $415_i$, $420_i$ associated with the i-th gate is different than a duration of each capture interval $410_{i+1}$, $415_{i+1}$, $420_{i+1}$ associated with the (i+1)-th gate, where i=1, 2, ..., n−1. Thus, image data stored in each local storage location of a respective gate is associated with a different exposure value of the imaging device 240. The exposure value of the imaging device 240 is based on, e.g., ISO of the imaging device 240, a gain of the imaging device 240, a size of the imaging aperture 120, a length of a shutter of the imaging device 240, a speed of the shutter, some other parameter, or combination thereof. In alternative embodiments (not shown in FIG. 4), each capture interval is a same time interval for each gate that has a respective local storage location, but has a different number of repetitions within the exposure interval 405. In this way, image data stored in each local storage location of a respective gate is again associated with a different exposure value of the imaging device 240.

In some embodiments, the pixel timing diagram 400 is identical for all augmented pixels 310. A number of capture intervals for all augmented pixels 310 may be identical and depend on, e.g., a signal-to-noise ratio (SNR) associated with image data stored in the local storage locations of each augmented pixel 310.

In some other embodiments, the pixel timing diagram 400 can be different for two different augmented pixels 310. For example, an exposure interval 405 of one augmented pixel 310 is different than an exposure interval 405 of another augmented pixel 310. The controller 245 may be configured to assign a duration of the exposure interval 405 for an augmented pixel 310, based on a distance between the augmented pixel 310 and at least one object in the local area imaged at least partially by the augmented pixel 310. The controller 245 may obtain information about the distance from previously captured image data related to the at least one object or from some other camera assembly of an artificial reality system that includes the headset 100. For example, an exposure interval 405 for an augmented pixel 310 that images at least a portion of a far object would be longer than an exposure interval 405 for another augmented pixel 310 that images at least a portion of a close object.

In some embodiments, the controller 245 may be configured to assign a duration of the exposure interval 405 for an augmented pixel 310, based on a brightness of at least one object in the local area imaged at least partially by the augmented pixel 310. The controller 245 may determine the brightness of the at least one object based on image data stored in local storage locations of the augmented pixel 310 during a previous exposure interval. For example, an exposure interval 405 for an augmented pixel 310 imaging at least a portion of an object having a low level of brightness would be longer than an exposure interval 405 for another augmented pixel 310 imaging at least a portion of an object having a high level of brightness.

As a duration of the exposure interval 405 may depend on a number of repeated capture intervals within the exposure interval 405, the controller 245 may assign the number of intervals for repetition an augmented pixel 310, based on a distance between the augmented pixel 310 and at least one object in the local area imaged at least partially by the augmented pixel. In some embodiments, the controller 245 may assign the number of intervals for repetition for an augmented pixel 310, based on a brightness of at least one object in the local area imaged at least partially by the augmented pixel 310.

In some embodiments (not shown in FIG. 4), drain intervals occur between two capture intervals. During each of the drain intervals, a drain gate (e.g., 320D) of the augmented pixel 310 may be activated so that charges related to any light incident to a surface of the augmented pixel 310 during the drain interval are not recorded. The drain interval may be placed between two capture intervals, e.g., the capture intervals $410_n$ and $415_1$, to prevent that image data related to the same portion of light is saved in two different local storage locations of two different gates (e.g., the gates 320C, 320A) of the augmented pixel 310. For example, without the drain interval inserted between the two capture intervals $410_n$ and $415_1$, a certain charge related to a portion of light reflected from, e.g., a distant object in the local area might be saved during a portion of the capture interval $415_1$ in a local storage location of the first gate. The drain interval inserted between a pair of capture intervals (e.g., $410_n$ and $415_1$) may allow for enough time to pass such that all portions of light of that originate from, e.g., a distant object have already reached the detector 315 of the augmented pixel 310 and would not be saved in a second captured interval in the par (e.g., the capture interval $415_1$).

After the exposure interval 405, e.g., during a read out interval 425, the controller 245 initiates read-out of the image data stored in the local storage locations of each augmented pixel 310 of the imaging device 240. Note that, for the conventional cameras, instead of the single read out interval 425, there are multiple read out intervals, e.g., n read out intervals after each capture interval associated with a corresponding gate. Thus, the approach presented herein based on the single read out interval 425 allows much faster operation of the imaging device 240 in the camera assembly 115 in comparison with the conventional cameras.

The controller 245 obtains the stored image data and generates a plurality of intermediate images that each have a dynamic range. The controller 245 may then generate an image for the portion of the local area using the plurality of intermediate images, wherein the image has a higher dynamic range than each of the intermediate images. Each pixel value of an intermediate image may be generated using image data stored in a corresponding local storage area of a corresponding gate of the augmented pixel 310 captured during corresponding capture intervals. For example, the controller 245 generates each pixel value of a first of the intermediate images using image data stored in a local storage location of a gate 320A of an augmented pixel 310 captured during the capture intervals $410_1$, $415_1$, $420_1$. Similarly, the controller 245 generates each pixel value of a second of the intermediate images using image data stored in a local storage location of a gate 320B of an augmented pixel 310 captured during the capture intervals $410_2$, $415_2$, $420_2$; and the controller 245 generates each pixel value of a third of the intermediate images using image data stored in a local storage location of a gate 320C of an augmented pixel 310 captured during the capture intervals $410_3$, $415_3$, $420_3$. Then, the controller 245 generates each pixel value of the high dynamic range image by combining corresponding pixel values of the first, second and third intermediate images.

In some embodiments, the controller 245 generates the high dynamic range image for the portion of the local area by applying a reconstruction algorithm on the plurality of intermediate images. In one or more embodiments, the controller 245 applies the reconstruction algorithm to compute each pixel value of the high dynamic range image based on means of corresponding pixel values of the intermediate images. For example, in the case of three intermediate images, the controller 245 computes each pixel value of the high dynamic range image based on a first mean of corresponding pixel values of the first and second intermediate images and on a second mean of corresponding pixel values of the second and third intermediate images. In some other embodiments, the controller 245 generates the high dynamic range image for the portion of the local area by applying a machine learning algorithm on the plurality of intermediate images. In one or more embodiments, the machine learning algorithm is applied to learn weights of different exposures in the reconstruction at different regions, e.g., bright and dark regions. The machine learning algorithm may be applied to determine weights applied to pixel values of different intermediate images when combined to generate the high dynamic range image. For example, in one embodiment, each intermediate image can be associated with a corresponding single weight applied to all pixel values of that intermediate image. In another embodiment, different regions (e.g., dark and bright regions) of an intermediate image can be associated with different weights.

Figure 5:
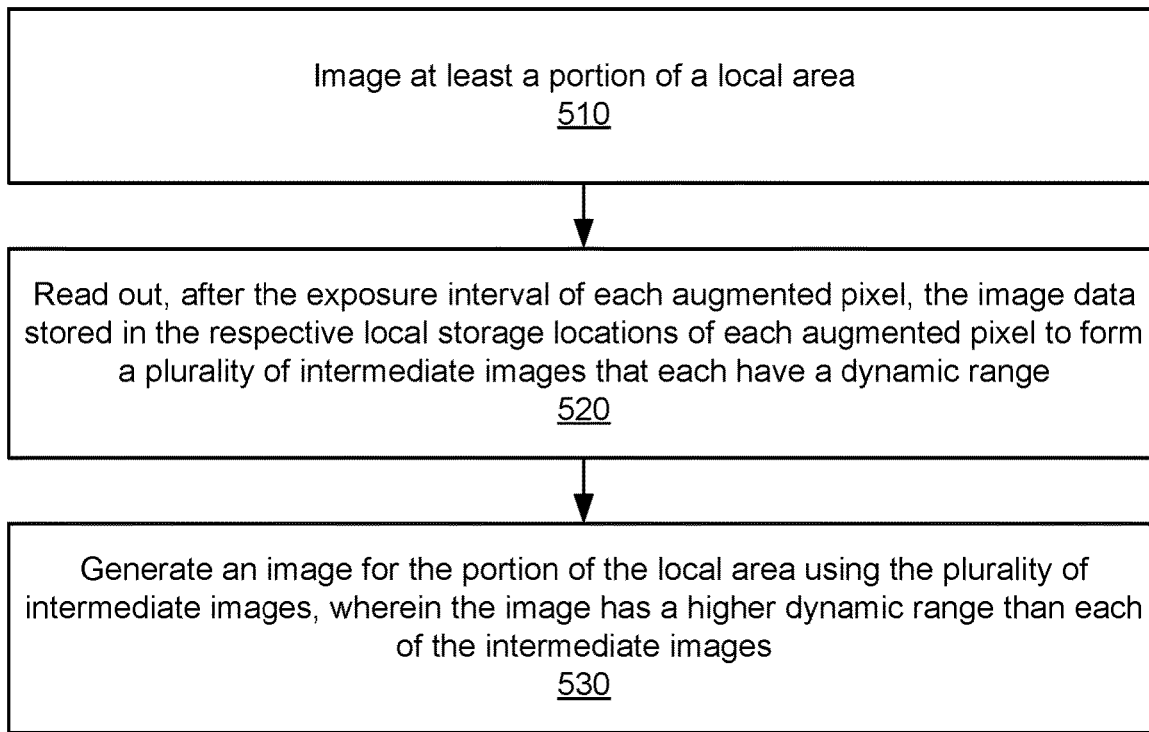
FIG. 5 is a flow chart illustrating a process of generating a high dynamic range image of a local area, in accordance with one or more embodiments.

FIG. 5 is a flow chart illustrating a process 500 of generating a high dynamic range image for a local area, which may be implemented at the headset 100 shown in FIG. 1, in accordance with one or more embodiments. The process 500 of FIG. 5 may be performed by the components of a camera assembly, e.g., the camera assembly 115 of FIGS. 1-2. Other entities (e.g., a headset and/or console) may perform some or all of the steps of the process in other embodiments. Likewise, embodiments may include different and/or additional steps, or perform the steps in different orders.

The camera assembly images 510 at least a portion of a local area. The camera assembly images the portion of the local area using a sensor of a camera (e.g., the imaging device 240). The sensor includes a plurality of augmented pixels, each augmented pixel having a plurality of gates and at least some of the gates have a respective local storage location. An exposure interval of each augmented pixel may be divided into intervals (e.g., capture intervals) that are associated with the gates, wherein each local storage location stores image data during a respective interval. In some embodiments, each interval is different for each gate that has a respective local storage location. In some other embodiments, each interval is a same time interval for each gate that has a respective local storage location, but has a different number of repetitions within the exposure interval. In yet some other embodiments, a first exposure interval of a first augmented pixel of the plurality of augmented pixels is different than a second exposure interval of a second augmented pixel of the plurality of augmented pixels.

The camera assembly reads out 520 (e.g., via a controller), after the exposure interval of each augmented pixel, the image data stored in the respective local storage locations of each augmented pixel to form a plurality of intermediate images that each have a dynamic range. Each intermediate image may associated with a different exposure value of the camera assembly.

The camera assembly generates 530 (e.g., via the controller) an image for the portion of the local area using the plurality of intermediate images, wherein the image has a higher dynamic range than each of the intermediate images. In some embodiments, the camera assembly generates (e.g., via the controller) the image for the portion of the local area by applying a reconstruction algorithm on the plurality of intermediate images. In some other embodiments, the camera assembly generates (e.g., via the controller) the image for the portion of the local area by applying a machine learning algorithm on the plurality of intermediate images.

Time-of Flight Depth Sensing

Figure 6:
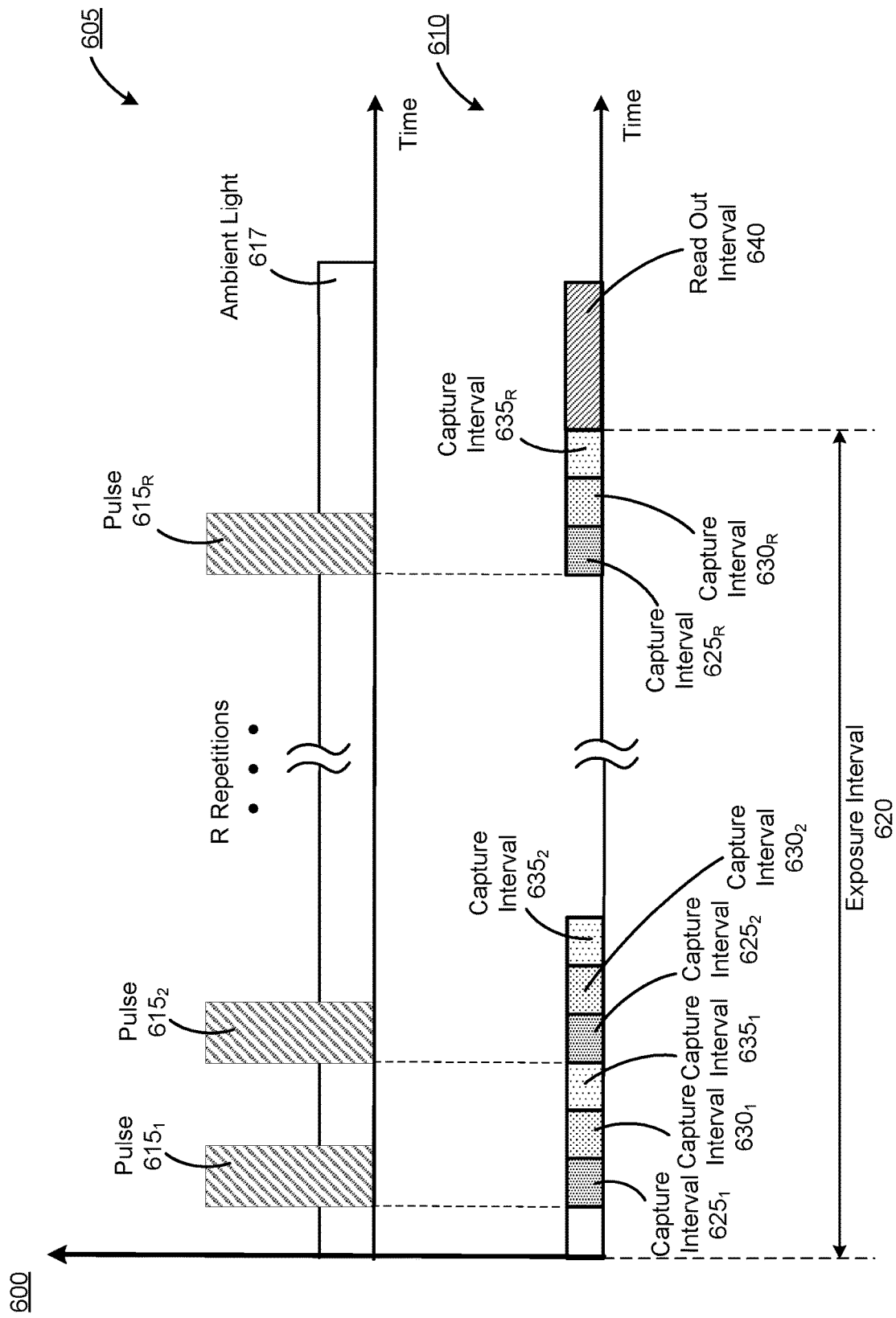
FIG. 6 is an example of timing diagrams for time-of-flight operation, in accordance with one or more embodiments.

FIG. 6 is an example 600 of timing diagrams 605 and 610 for time-of-flight operation, according to one or more embodiments. The timing diagrams 605, 610 relate to an embodiment for operating a DCA (e.g., the camera assembly 115) to determine depth information for a local area, e.g., based on time-of-flight.

The timing diagram 605 relates to operation of the light source assembly 230 operating as a continuous wave light source assembly, e.g., based on emission instructions from the controller 245. The controller 245 may instruct the light source assembly 230 to project pulses of light into a local area, e.g., pulses of light $615_1, 615_2, \ldots, 615_R$, where R is an integer greater than one, as shown in FIG. 6. For example, the pulses of light $615_1, 615_2, \ldots, 615_R$ may have a specific pulse rate. As shown in FIG. 6, the projected pulses of light $615_1, 615_2, \ldots, 615_R$ may form a pulse train that repeats in a periodic manner, e.g., R times, where R is greater than one. The number of repetitions, R, may depend on, e.g., a SNR associated with intensities of light stored in the local storage locations of the augmented pixel 310. In some embodiments, the light source assembly 230 includes a plurality of light sources emitting the pulses of light $615_1, 615_2, \ldots, 615_R$. In some other embodiments, the light source assembly 230 includes a single light source configured to emit the pulses of light $615_1, 615_2, \ldots, 615_R$. In addition to the pulses of light $615_1, 615_2, \ldots, 615_R$ illuminating the local area surrounding the DCA, a certain level of ambient light 617 may be also present in the local area. Although the ambient light 617 is illustrated in the timing diagram 605 to have a constant level of intensity over time, the intensity of ambient light 617 may vary over time.

The timing diagram 610 is a pixel timing diagram for an augmented pixel (e.g., an embodiment of the augmented pixel 310 that has three gates) of the imaging device 240. The augmented pixel 310 may operate in accordance with the timing diagram 610 based on e.g., capture instructions from the controller 245. The augmented pixel 310 may be configured to image, over an exposure interval 620, a portion of the local area illuminated with the pulses of light, e.g., the pulses of light $615_1, 615_2, \ldots, 615_R$. The exposure interval 620 may be divided into intervals that include capture intervals, e.g., capture intervals $625_1, 630_1, 635_1, 625_2, 630_2, 635_2, \ldots, 625_R, 630_R, 635_R$, as shown in FIG. 6. As shown in FIG. 6, the capture intervals $625_1, 625_2, \ldots, 625_R$ are synchronized to the pulses of light $615_1, 615_2, \ldots, 615_R$, respectively. Also, portions of the capture intervals $630_1, 630_2, \ldots, 630_R$ overlap with the respective projected pulses of light $615_1, 615_2, \ldots, 615_R$.

In this embodiment, each augmented pixel 310 includes three gates, e.g., 320A, 320B, and 320C. During the capture intervals $625_1, 625_2, \ldots, 625_R$, one of the gates 320A, 320B, 320C (e.g., the gate 320A) may be activated to enable an associated local storage location to store image data (i.e., intensities of light) associated with portions of the pulses of light $615_1, 615_2, \ldots, 615_R$ reflected from a first portion of the local area corresponding to a first range of distances from the camera assembly. The other gates (e.g., all but 320A) are inactive during the capture intervals $625_1, 625_2, \ldots, 625_R$. During the capture intervals $630_1, 630_2, \ldots, 630_R$, one of the gates 320A, 320B, 320C (e.g., the gate 320B) may be activated to enable an associated local storage location to store image data (i.e., intensities of light) associated with portions of the pulses of light $615_1, 615_2, \ldots, 615_R$ reflected from a second portion of the local area corresponding to a second range of distances from the camera assembly, and the second range of distances is farther from the camera assembly than the first range of distances. The other gates (e.g., all but 320B) are inactive during the capture intervals $630_1, 630_2, \ldots, 630_R$. During the capture intervals $635_1, 635_2, \ldots, 635_R$, one of the gates 320A, 320B, 320C (e.g., the gate 320C) may be activated to enable an associated local storage location to store image data (i.e., intensities of light) associated with portions of the pulses of light $615_1, 615_2, \ldots, 615_R$ reflected from a third portion of the local area corresponding to a third range of distances from the camera assembly, and the third range of distances is farther from the camera assembly than the second range of distances. The other gates (e.g., all but 320C) are inactive during the capture intervals $635_1, 635_2, \ldots, 635_R$.

The timing diagram 610 can be replicated for each augmented pixel (e.g., the augmented pixel 310) of the imaging device 240. Corresponding local storage locations of each augmented pixel of the imaging device 240 may store image data associated with the corresponding pulses of light $615_1, 615_2, \ldots, 615_R$. The image data may be stored in the local storage locations of each augmented pixel during corresponding capture intervals of the exposure interval 620.

After the exposure interval 620, e.g., during a read out interval 640, the controller 245 initiates read-out of the image data stored in the local storage locations of each augmented pixel of the imaging device 240. Note that, for the conventional cameras, instead of the single read out interval 640, there are multiple read out intervals, e.g., R read out intervals after each exposure sub-interval associated with a corresponding pulse of light. Thus, the approach presented herein based on the single read out interval 640 allows much faster operation of the imaging device 240 in the camera assembly 115 in comparison with the conventional cameras. The controller 245 obtains the stored image data and generates a plurality of image data frames. The controller 245 may then determine depth information for the local area, based in part on the plurality of image data frames. The controller 245 may further determine information about intensity reconstruction for the local area, based in part on the plurality of image data frames.

In some embodiments, the controller 245 determines the depth information for the local area based on, e.g., indirect time-of-flight depth sensing. For the indirect time-of-flight depth sensing, the controller 245 may first determine a phase of light captured at each augmented pixel 310, based on the image data stored in the respective local storage locations of that augmented pixel 310. The controller 245 may then determine the depth information for the local area based in part on the phase of light determined for each augmented pixel 310. To determine the depth information, the controller 245 calculates, for each pixel 310, coefficients a and b defined as:

$$a = \sum_{i=1}^{G} I_i \cdot \cos(i-1) \cdot \frac{360°}{G}, \quad (1)$$

$$b = \sum_{i=1}^{G} I_i \cdot \sin(i-1) \cdot \frac{360°}{G}, \quad (2)$$

where $I_i$, i=1, 2, . . . , G, are intensities of light stored in local storage locations of that augmented pixel 310 associated with corresponding gates, and G is a total number of non-drain gates in the augmented pixel 310 (e.g., G=3). The controller 245 determines a phase $\phi$ of light captured at each augmented pixel 310 as:

$$\phi = \arctan\left(\frac{b}{a}\right). \quad (3)$$

The controller 245 then determines a depth d for each augmented pixel 310 as:

$$d = \frac{\phi}{4\pi f} c. \quad (4)$$

where c is the speed of light, and f is a frequency of captured light. Note also that a wavelength of light $\lambda$ is defined as a ratio of the speed of light and the frequency of light. Thus, the depth d for each augmented pixel 310 can be determined as:

$$d = \frac{\phi}{4\pi} \cdot \lambda. \quad (5)$$

The controller 245 may also determine the intensity reconstruction I for each augmented pixel 310 as:

$$I = \sqrt{a^2 + b^2}. \quad (6)$$

Note that, as all the local storage locations associated with their respective gates of each augmented pixel 310 of the imaging device 240 are read out once after the exposure interval 620, the motion blur is reduced compared to that of conventional time-of-flight based DCAs. Furthermore, the camera assembly 115 operating in accordance with the timing diagrams 605, 610 provides improved depth precision, accuracy, probability of valid measurement, and larger imaging range in comparison with conventional time-of-flight based DCAs.

In some other embodiments, each augmented pixel in a sensor of a DCA (e.g., the augmented pixel 310 of the sensor 300 in the camera assembly 115) may have additional gates (e.g., more than three non-drain gates) for capturing light reflected from different portions of a local area surrounding the DCA. Thus, instead of three capture intervals that are associated with each pulse of light illustrated in FIG. 6, additional capture intervals would be included into the exposure interval 620 that are associated with each pulse of light emitted from a light source assembly of the DCA.

Figure 7A:
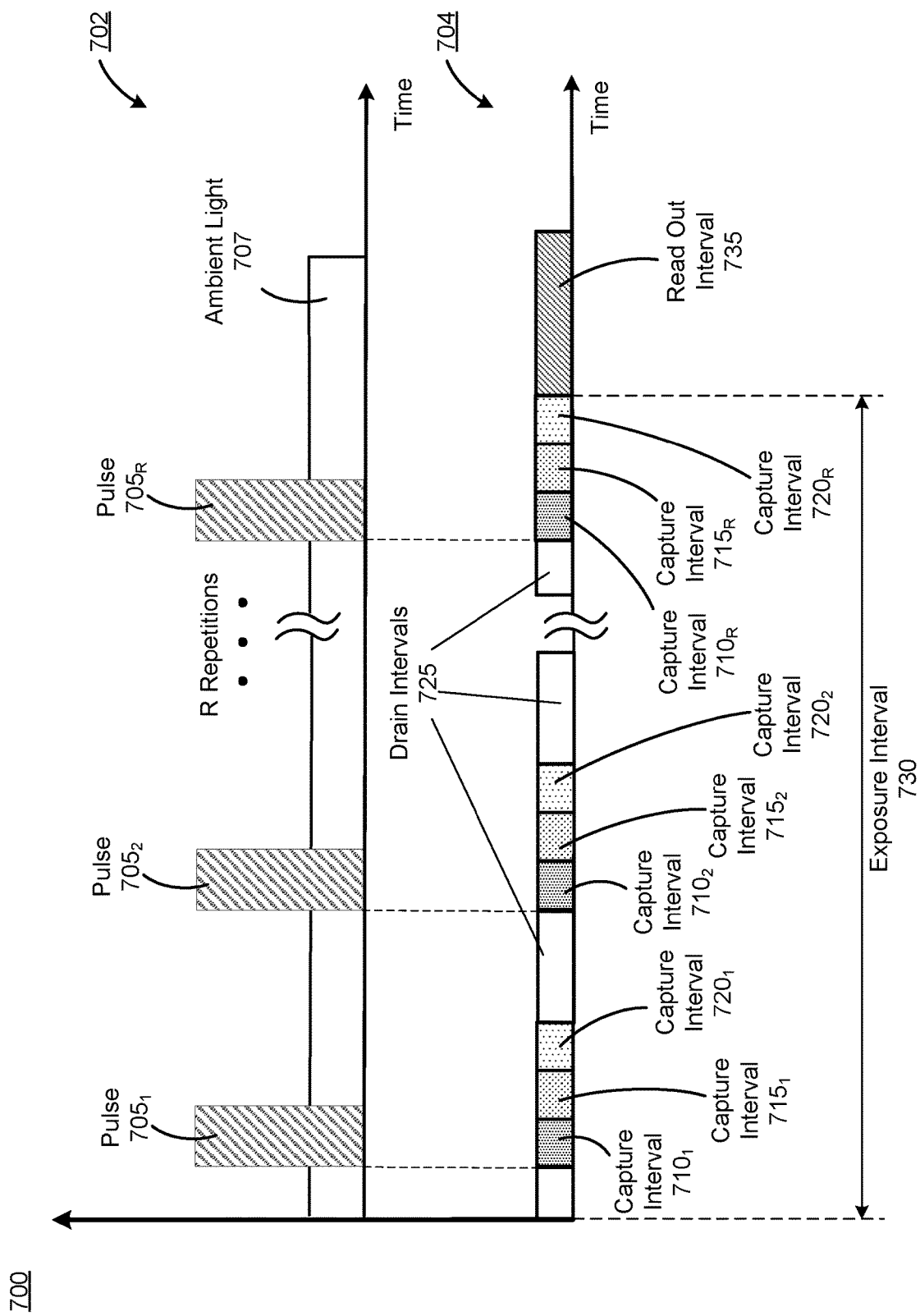
FIG. 7A is an example of timing diagrams for time-of-flight operation that includes drain intervals, in accordance with one or more embodiments.

FIG. 7A is an example 700 of timing diagrams 702 and 704 for time-of-flight operation that includes drain intervals, in accordance with one or more embodiments. The timing diagrams 702, 704 relate to an embodiment for operating a DCA (e.g., the camera assembly 115) to determine depth information for a local area, where an exposure interval of the DCA includes drain intervals.

The timing diagram 702 relates to operation of the light source assembly 230 operating as a pulsed phasor light source, e.g., based on emission instructions from the controller 245. The controller 245 may instruct the light source assembly 230 to project pulses of light into a local area, e.g., pulses of light $705_1, 705_2, \ldots, 705_R$, where R is an integer equal or greater than one. The light source assembly 230 configured as a pulsed phasor light source may emit a set of discrete pulses of light $705_1, 705_2, \ldots, 705_R$ with or without a specific periodicity. The number of repetitions, R, may depend on, e.g., a SNR associated with intensities of light stored in the local storage locations of the augmented pixel 310. In some embodiments, the light source assembly 230 includes a plurality of light sources emitting the pulses of light $705_1, 705_2, \ldots, 705_R$. In some other embodiments, the light source assembly 230 includes a single light source configured to emit the pulses of light $705_1, 705_2, \ldots, 705_R$. In addition to the pulses of light $705_1, 705_2, \ldots, 705_R$ illuminating the local area surrounding the DCA, a certain level of ambient light 707 may be also present in the local area. Although the ambient light 707 is illustrated in the timing diagram 702 to have a constant level of intensity over time, the intensity of ambient light 707 may vary over time.

The timing diagram 704 is a pixel timing diagram for an augmented pixel (e.g., the augmented pixel 310) of the imaging device 240. The augmented pixel 310 may operate in accordance with the timing diagram 704 based on e.g., capture instructions from the controller 245. The augmented pixel 310 may be configured to image, over an exposure interval 730, a portion of the local area illuminated with the pulses of light, e.g., the pulses of light $705_1, 705_2, \ldots, 705_R$. The exposure interval 730 may be divided into intervals that include capture intervals and drain intervals, e.g., capture intervals $710_1, 715_1, 720_1, 710_2, 715_2, 720_2, \ldots, 710_R, 715_R, 720_R$ and drain intervals 725, as shown in FIG. 7A. As shown in FIG. 7A, the capture intervals $710_1, 710_2, \ldots, 710_R$ are synchronized to the pulses of light $705_1, 705_2, \ldots, 705_R$, respectively. Also, portions of the capture intervals $715_1, 715_2, \ldots, 715_R$ overlap with the respective projected pulses of light $705_1, 705_2, \ldots, 705_R$.

In this embodiment, each augmented pixel 310 includes four gates, e.g., 320A, 320B, 320C, and 320D, where 320A, 320B, and 320C have an associated local storage area, and 320D is a drain. During the capture intervals $710_1, 710_2, \ldots, 710_R$, one of the gates 320A, 320B, 320C (e.g., the gate 320A) may be activated to enable an associated local storage location to store image data (i.e., intensities of light) associated with portions of the pulses of light $710_1, 710_2, \ldots, 710_R$ reflected from a first portion of the local area corresponding to a first range of distances from the camera assembly. The other gates (e.g., all but 320A) are inactive during the capture intervals $710_1, 710_2, \ldots, 710_R$. During the capture intervals $715_1, 715_2, \ldots, 715_R$, one of the gates 320A, 320B, 320C (e.g., the gate 320B) may be activated to enable an associated local storage location to store image data (i.e., intensities of light) associated with portions of the pulses of light $705_1, 705_2, \ldots, 705_R$ reflected from a second portion of the local area corresponding to a second range of distances from the camera assembly, and the second range of distances is farther from the camera assembly than the first range of distances. The other gates (e.g., all but 320B) are inactive during the capture intervals $715_1, 715_2, \ldots, 715_R$. During the capture intervals $720_1, 720_2, \ldots, 720_R$, one of the gates 320A, 320B, 320C (e.g., the gate 320C) may be activated to enable an associated local storage location to store image data (i.e., intensities of light) associated with portions of the pulses of light $705_1, 705_2, \ldots, 705_R$ reflected from a third portion of the local area corresponding to a third range of distances from the camera assembly, and the third range of distances is farther from the camera assembly than the second range of distances. The other gates (e.g., all but 320C) are inactive during the capture intervals $720_1, 720_2, \ldots, 720_R$.

Drain intervals 725 occur after the end of capture intervals $720_1, 720_2, \ldots, 720_{R-1}$. During each of the drain intervals 725, the drain gate 320D of the augmented pixel 310 may be activated so that charges related to light detected by the augmented pixel 310 during the drain interval 725 are not recorded (e.g., may be shunted to ground). In some embodiments, a drain interval 725 may be placed after each capture interval $720_1, 720_2, \ldots, 720_{R-1}$, to provide some cooling time for the DCA (e.g., the camera assembly 115) between high power pulses of light $705_1, 705_2, \ldots, 705_R$ designed to overwhelm the ambient light 707. Also, inserting a drain interval 725 after each capture interval $720_1, 720_2, \ldots, 720_{R-1}$ helps prevent light from objects far away from ending up being detected in a first capture interval in a group of capture intervals (i.e., any of the capture intervals $710_2, \ldots, 710_R$). Thus, a drain interval 725 inserted after each capture interval $720_1, 720_2, \ldots, 720_{R-1}$ acts to isolate groups of capture intervals from each other.

The timing diagram 704 can be replicated for each augmented pixel (e.g., the augmented pixel 310) of the imaging device 240. Corresponding local storage locations of each augmented pixel of the imaging device 240 may store image data associated with the corresponding pulses of light $705_1, 705_2, \ldots, 705_R$. The image data may be stored in the local storage locations of each augmented pixel during corresponding capture intervals of the exposure interval 730.

After the exposure interval 730, e.g., during a read out interval 735, the controller 245 initiates read-out of the image data stored in the local storage locations of each augmented pixel of the imaging device 240. The controller 245 obtains the stored image data and generates a plurality of image data frames. The controller 245 may then determine depth information for the local area, based in part on the plurality of image data frames, e.g., as defined by equations (1)-(5). The controller 245 may further determine information about intensity reconstruction for the local area, based in part on the plurality of image data frames, e.g., as defined by equations (1), (2) and (6).

In some other embodiments, each augmented pixel in a sensor of a DCA (e.g., the augmented pixel 310 of the sensor 300 in the camera assembly 115) may have additional gates (e.g., more than three non-drain gates) for capturing light reflected from different portions of a local area surrounding the DCA. Thus, instead of three capture intervals that are associated with each pulse of light illustrated in FIG. 7A, additional capture intervals would be included into the exposure interval 730 that are associated with each pulse of light emitted from a light source assembly of the DCA.

Figure 7B:
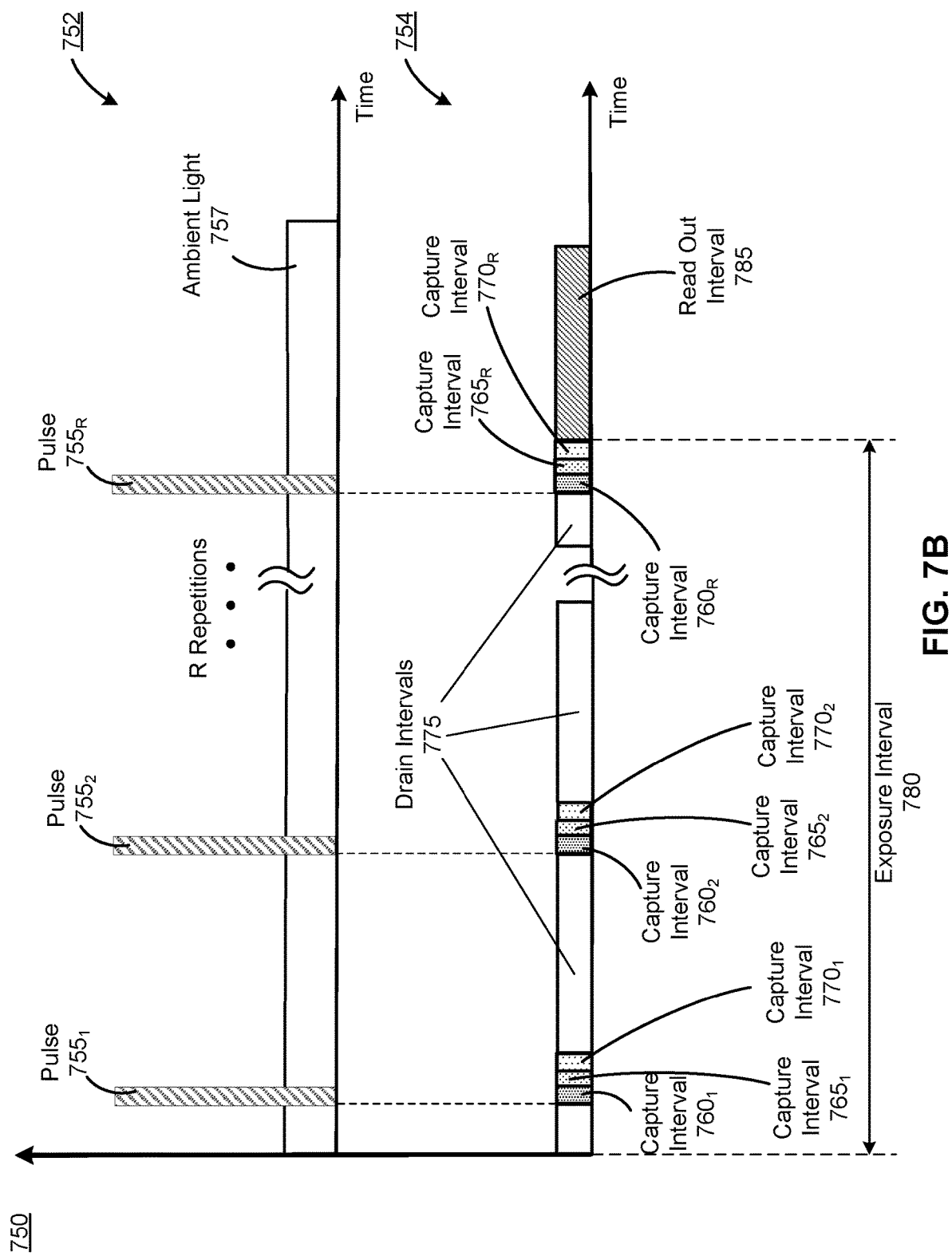
FIG. 7B is an example of timing diagrams for time-of-flight operation and reduced noise from ambient light, in accordance with one or more embodiments.

FIG. 7B is an example 750 of timing diagrams 752 and 754 for time-of-flight operation and reduced noise from ambient light, according to one or more embodiments. The timing diagrams 752, 754 relate to another embodiment for operating a DCA (e.g., the camera assembly 115) to determine depth information for a local area, e.g., based on time-of-flight. The embodiment for operating the DCA illustrated by the timing diagrams 752, 754 feature narrow light pulses and narrow capture intervals (e.g., pulses and capture intervals having time duration less than a threshold time period) during which corresponding gates are activated in order to reduce a total active exposure time of the DCA. This approach for operating the DCA may reduce exposure to ambient light, which can be advantageous in e.g., outdoor environments with high levels of ambient light. The active exposure time of the DCA can be defined as a portion of a total exposure interval of the DCA during which corresponding gates of each augmented pixel of a DCA's sensor are activated to enable an associated local storage location to store image data (drain intervals are not part of the active exposure time).

The timing diagram 752 relates to operation of the light source assembly 230 operating as a pulsed phasor light source, e.g., based on emission instructions from the controller 245. The operation of the light source assembly 230 illustrated by the timing diagram 752 is the same as the operation of the light source assembly 230 illustrated by the timing diagram 702 in FIG. 7A except that pulses of light $755_1, 755_2, \ldots, 755_R$ are narrower that the pulses of light $705_1, 705_2, \ldots, 705_R$. An intensity of each pulse of light $755_1, 755_2, \ldots, 755_R$ may be higher than that of the corresponding pulses of light $705_1, 705_2, \ldots, 705_R$. An intensity level of ambient light 757 shown in FIG. 7B can be the same as an intensity level of ambient light 707 of FIG. 7A.

In this embodiment, each augmented pixel 310 includes four gates, e.g., 320A, 320B, 320C, and 320D, where 320A, 320B, and 320C have an associated local storage area, and 320D is a drain. The timing diagram 754 is a pixel timing diagram for an augmented pixel (e.g., the augmented pixel 310) of the imaging device 240. The augmented pixel 310 may operate in accordance with the timing diagram 754 based on e.g., capture instructions from the controller 245. The augmented pixel 310 may be configured to image, over an exposure interval 780, a portion of the local area illuminated with the pulses of light, e.g., the pulses of light $755_1, 755_2, \ldots, 755_R$. The exposure interval 730 may be divided into intervals that include capture intervals and drain intervals, e.g., capture intervals $760_1, 765_1, 770_1, 760_2, 765_2, 770_2, \ldots, 760_R, 765_R, 770_R$ and drain intervals 775, as shown in FIG. 7B. The operation of the augmented pixel illustrated by the timing diagram 754 is the same as the operation of the augmented pixel illustrated by the timing diagram 704 of FIG. 7A except that a duration of each capture interval $760_1, 765_1, 770_1, 760_2, 765_2, 770_2, \ldots, 760_R, 765_R, 770_R$ is shorter than a duration of a corresponding capture interval $710_1, 715_1, 720_1, 710_2, 715_2, 720_2, \ldots, 710_R, 715_R, 720_R$ of FIG. 7A. As shown in FIG. 7B, the capture intervals $760_1, 760_2, \ldots, 760_R$ are synchronized to the pulses of light $755_1, 755_2, \ldots, 755_R$, respectively. Due to a shorter time duration, portions of the capture intervals $765_1, 765_2, \ldots, 765_R$ may not overlap with the respective projected pulses of light $755_1, 755_2, \ldots, 755_R$.

Drain intervals 775 occur after the end of capture intervals $770_1, 770_2, \ldots, 770_{R-1}$, i.e., in the same manner as the drain intervals 725 of FIG. 7A. During each of the drain intervals 775, the drain gate 320D of the augmented pixel 310 may be activated so that charges related to light detected by the augmented pixel 310 during the drain interval 775 are not recorded (e.g., may be shunted to ground). In some embodiments, a drain interval 775 may be placed after each capture interval $770_1, 770_2, \ldots, 770_{R-1}$, to provide some cooling time for the DCA (e.g., the camera assembly 115) between high power pulses of light $755_1, 755_2, \ldots, 755_R$ designed to overwhelm the ambient light 757. Also, inserting a drain interval 775 after each capture interval $770_1, 770_2, \ldots, 770_{R-1}$ helps prevent light from objects far away from ending up being detected in a first capture interval in a group of capture intervals (i.e., any of the capture intervals $760_2, \ldots, 760_R$). Thus, a drain interval 775 inserted after each capture interval $770_1, 770_2, \ldots, 770_{R-1}$ acts to isolate groups of capture intervals from each other. A length of each drain interval 775 may be determined based on an intensity of a corresponding pulse of light $755_1, 755_2, \ldots, 755_R$ such that to provide a sufficient level of cooling for the DCA. Also, a length of each drain interval 775 may be determined based on a desired range of a local area covered by the DCA as the drain interval 775 prevents light from far objects from ending up being detected in a wrong capture interval. The timing diagram 754 can be replicated for each augmented pixel (e.g., the augmented pixel 310) of the imaging device 240 in the same manner as the timing diagram 704 of FIG. 7A.

After the exposure interval 780, e.g., during a read out interval 785, the controller 245 initiates read-out of the image data stored in the local storage locations of each augmented pixel of the imaging device 240. The controller 245 obtains the stored image data and generates a plurality of image data frames. The controller 245 may then determine depth information for the local area, based in part on the plurality of image data frames, e.g., as defined by equations (1)-(5). The controller 245 may further determine information about intensity reconstruction for the local area, based in part on the plurality of image data frames, e.g., as defined by equations (1), (2) and (6).

In some other embodiments, each augmented pixel in a sensor of a DCA (e.g., the augmented pixel 310 of the sensor 300 in the camera assembly 115) may have additional gates (e.g., more than three non-drain gates) for capturing light reflected from different portions of a local area surrounding the DCA. Thus, instead of three capture intervals that are associated with each pulse of light illustrated in FIG. 7B, additional capture intervals would be included into the exposure interval 780 that are associated with each pulse of light emitted from a light source assembly of the DCA.

Figure 8:
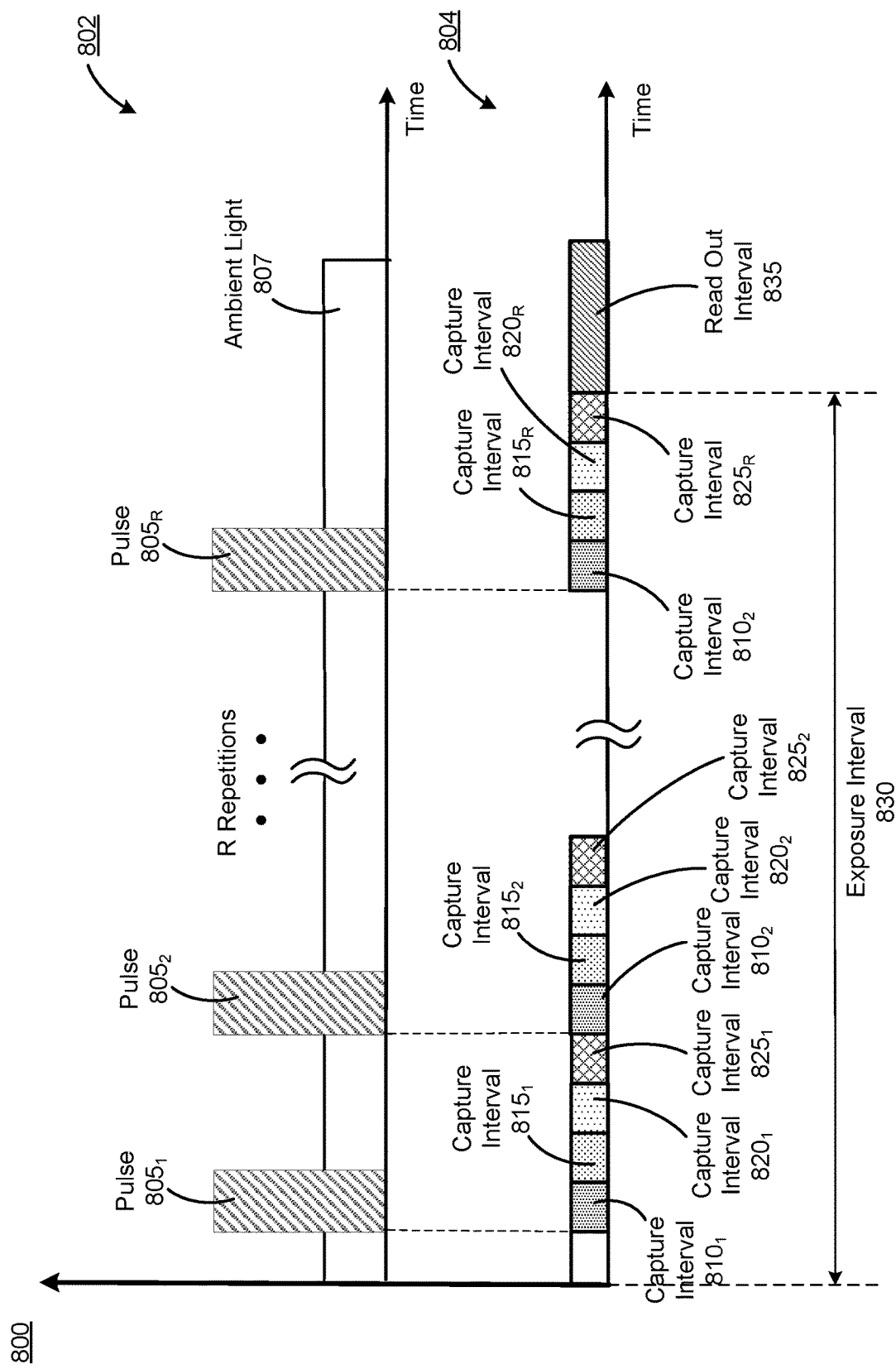
FIG. 8 is an example of timing diagrams for continuous wave time-of-flight operation, in accordance with one or more embodiments.

FIG. 8 is an example 800 of timing diagrams 802 and 804 for continuous wave time-of-flight operation, according to one or more embodiments. The timing diagrams 802, 804 relate to an embodiment for operating a DCA (e.g., the camera assembly 115) to determine depth information for a local area, wherein each augmented pixel may include four gates each having a corresponding local storage location for storing image data. For example, in the embodiment shown in FIG. 8, each augmented pixel 310 of the sensor 300 in the camera assembly 115 includes gates 320A, 320B, 320C, 320D each having a respective local storage location for storing image data.

The timing diagram 802 relates to operation of the light source assembly 230 operating as a continuous wave light source, e.g., based on emission instructions from the controller 245. The controller 245 may instruct the light source assembly 230 to project pulses of light into a local area, e.g., pulses of light $805_1, 805_2, \ldots, 8055_R$, where R is an integer greater than one, as shown in FIG. 8. For example, the pulses of light $805_1, 805_2, \ldots, 805_R$ may have a specific pulse rate. The projected pulses of light $805_1, 805_2, \ldots, 805_R$ may form a pulse train that repeats in a periodic manner, e.g., R times, where R is greater than one. The number of repetitions, R, may depend on, e.g., a SNR associated with intensities of light stored in the local storage locations of the augmented pixel 310. In some embodiments, the light source assembly 230 includes a plurality of light sources emitting the pulses of light $805_1, 805_2, \ldots, 805_R$. In some other embodiments, the light source assembly 230 includes a single light source configured to emit the pulses of light $805_1, 805_2, \ldots, 805_R$. In addition to the pulses of light $805_1, 805_2, \ldots, 805_R$ illuminating the local area surrounding the DCA, a certain level of ambient light 807 may be also present in the local area. Although the ambient light 807 is illustrated in the timing diagram 802 to have a constant level of intensity over time, the intensity of ambient light 807 may vary over time.

The timing diagram 804 is a pixel timing diagram for an augmented pixel (e.g., the augmented pixel 310) of the imaging device 240. The augmented pixel 310 may operate in accordance with the timing diagram 804 based on e.g., capture instructions from the controller 245. The augmented pixel 310 may be configured to image, over an exposure interval 830, a portion of the local area illuminated with the pulses of light, e.g., the pulses of light $805_1, 805_2, \ldots, 805_R$. The exposure interval 830 may be divided into intervals that include capture intervals, e.g., capture intervals $810_1, 815_1, 820_1, 825_1, 810_2, 815_2, 820_2, 825_2, \ldots, 810_R, 815_R, 820_R, 825_R$, as shown in FIG. 8. The capture intervals $810_1, 810_2, \ldots, 810_R$ are synchronized to the pulses of light $805_1, 805_2, \ldots, 805_R$, respectively.

In this embodiment, each augmented pixel 310 includes four gates, e.g., 320A, 320B, 320C, and 320D each having an associated local storage area. During the capture intervals $810_1, 810_2, \ldots, 810_R$, one of the gates 320A, 320B, 320C, 320D (e.g., the gate 320A) may be activated to enable an associated local storage location to store image data (i.e., intensities of light) associated with portions of the pulses of light $805_1, 805_2, \ldots, 805_R$ reflected from a first portion of the local area corresponding to a first range of distances from the camera assembly. The other gates (e.g., all but 320A) are inactive during the capture intervals $810_1, 810_2, \ldots, 810_R$. During the capture intervals $815_1, 815_2, \ldots, 815_R$, one of the gates 320A, 320B, 320C, 320D (e.g., the gate 320B) may be activated to enable an associated local storage location to store image data (i.e., intensities of light) associated with portions of the pulses of light $805_1, 805_2, \ldots, 805_R$ reflected from a second portion of the local area corresponding to a second range of distances from the camera assembly, and the second range of distances is farther from the camera assembly than the first range of distances. The other gates (e.g., all but 320B) are inactive during the capture intervals $815_1, 815_2, \ldots, 815_R$. During the capture intervals $820_1, 820_2, \ldots, 820_R$, one of the gates 320A, 320B, 320C, 320D (e.g., the gate 320C) may be activated to enable an associated local storage location to store image data (i.e., intensities of light) associated with portions of the pulses of light $805_1, 805_2, \ldots, 805_R$ reflected from a third portion of the local area corresponding to a third range of distances from the camera assembly, and the third range of distances is farther from the camera assembly than the second range of distances. The other gates (e.g., all but 320C) are inactive during the capture intervals $820_1, 820_2, \ldots, 820_R$. During the capture intervals $825_1, 825_2, \ldots, 825_R$, one of the gates 320A, 320B, 320C, 320D (e.g., the gate 320D) may be activated to enable an associated local storage location to store image data (i.e., intensities of light) associated with portions of the pulses of light $805_1, 805_2, \ldots, 805_R$ reflected from a fourth portion of the local area corresponding to a fourth range of distances from the camera assembly, and the fourth range of distances is farther from the camera assembly than the third range of distances. The other gates (e.g., all but 320D) are inactive during the capture intervals $825_1$, $825_2$, ..., $825_R$. Note that, for the continuous wave time-of-flight operation presented herein, a phase shift in a light wave (i.e., light intensity signal) detected at a corresponding local storage location of an augmented pixel 310 is proportional to a distance of a reflection point of the wave, wherein the distance belongs to one of four ranges of distances.

The timing diagram 804 can be replicated for each augmented pixel (e.g., the augmented pixel 310) of the imaging device 240. Corresponding local storage locations of each augmented pixel of the imaging device 240 may store image data associated with the corresponding pulses of light $805_1$, $805_2$, ..., $805_R$. The image data may be stored in the local storage locations of each augmented pixel during corresponding capture intervals of the exposure interval 830.

After the exposure interval 830, e.g., during a read out interval 835, the controller 245 initiates read-out of the image data stored in the local storage locations of each augmented pixel of the imaging device 240. The controller 245 obtains the stored image data and generates a plurality of image data frames. The controller 245 may then determine depth information for the local area, based in part on the plurality of image data frames. The controller 245 may further determine information about intensity reconstruction for the local area, based in part on the plurality of image data frames.

In some embodiments, the controller 245 determines the depth information for the local area based on, e.g., indirect time-of-flight depth sensing. For the indirect time-of-flight depth sensing, the controller 245 may first determine a phase of light captured at each augmented pixel 310, based on the image data stored in the respective local storage locations of that augmented pixel 310. The controller 245 may then determine the depth information for the local area based in part on the phase of light determined for each augmented pixel 310. For each augmented pixel 310, the controller 245 calculates a phase as given by:

$$\phi = \arctan\left(\frac{I_4 - I_2}{I_3 - I_1}\right), \quad (7)$$

where $I_i$ is a light intensity readout (e.g., an analog or digital value associated with image data) from a local storage location of the i-th gate of that augmented pixel 310, i=1, 2, 3, 4. The controller 245 then determines a depth d for each augmented pixel 310 as given by equation (4) or equation (5). The controller 245 may also determine the intensity reconstruction I for each augmented pixel 310 as:

$$I = \frac{\sqrt{(I_4 - I_2)^2 + (I_3 - I_1)^2}}{2} \quad (8)$$

Note that in the case of G non-drain gates in each augmented pixel 310, where G>4, the phase and intensity reconstruction can be obtained for each augmented pixel 310 as defined by equations (1)-(6).

Note that the DCA having four gates with corresponding local storage locations per augmented pixel to store image data for determining depth information may feature a reduced harmonic error compared to that of the DCA having three gates with corresponding local storage locations per augmented pixel. In addition, the DCA having four gates with corresponding local storage locations per augmented pixel may feature a lower level of fixed pattern noise (e.g., the fixed pattern noise may be fully removed) compared to that of the DCA having three gates with corresponding local storage locations per augmented pixel.

In some other embodiments, each augmented pixel in a sensor of a DCA (e.g., the augmented pixel 310 of the sensor 300 in the camera assembly 115) may have additional gates (e.g., more than four non-drain gates) for capturing light reflected from different portions of a local area surrounding the DCA. Thus, instead of four capture intervals that are associated with each pulse of light illustrated in FIG. 8, additional capture intervals would be included into the exposure interval 830 that are associated with each pulse of light emitted from a light source assembly of the DCA.

Figure 9A:
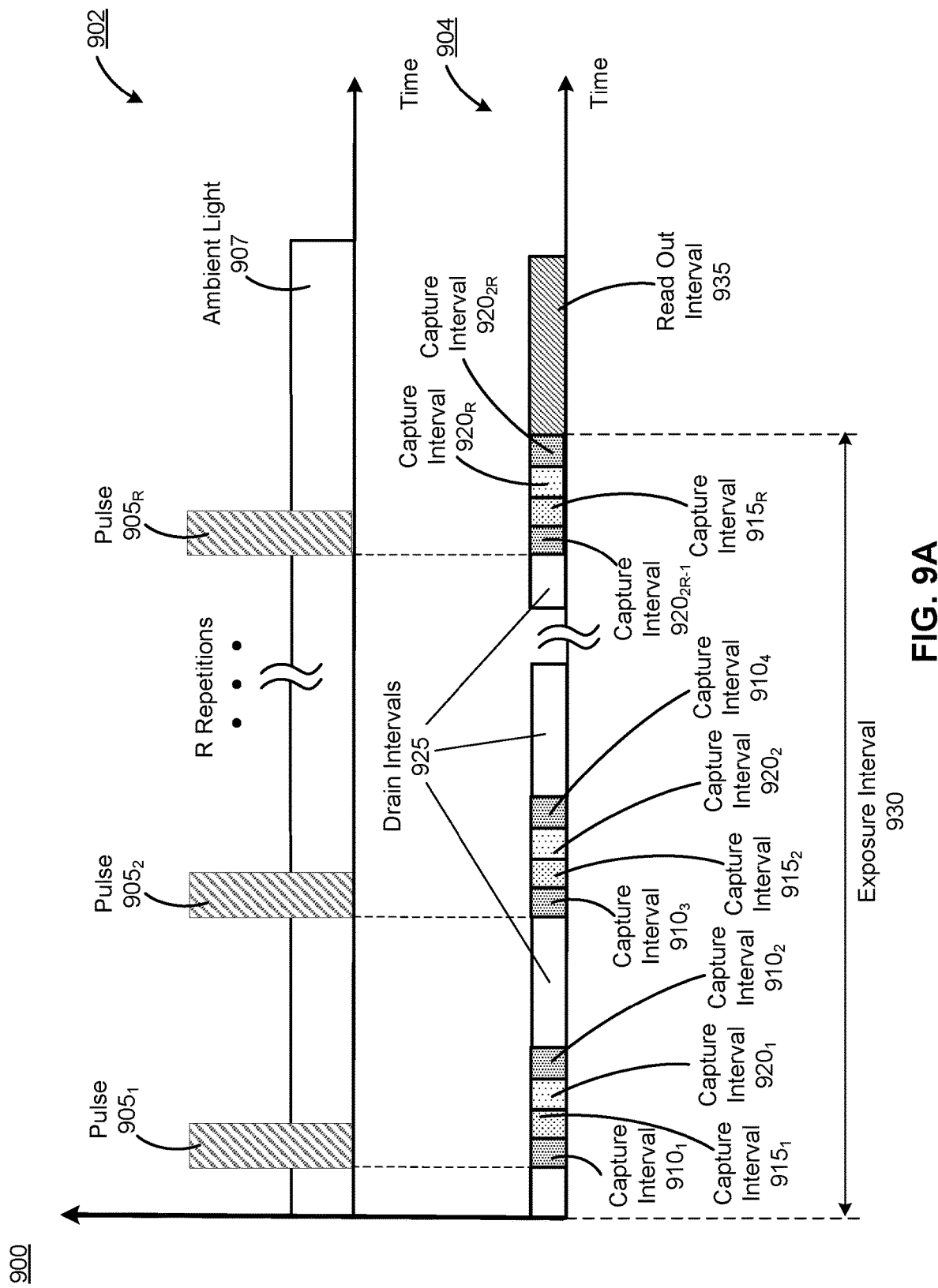
FIG. 9A is an example of timing diagrams for continuous wave time-of-flight operations that include a repeating capture interval in each group of capture intervals, in accordance with one or more embodiments.

FIG. 9A is an example 900 of timing diagrams 902 and 904 for continuous wave time-of-flight operations that include a repeating capture interval in each group of capture intervals, according to one or more embodiments. The timing diagrams 902, 904 relate to another embodiment for operating a DCA (e.g., the camera assembly 115) to determine depth information for a local area, where a number of capture intervals within an exposure interval of the DCA is not the same for each gate.

The timing diagram 902 relates to operation of the light source assembly 230 operating as a continuous wave light source, e.g., based on emission instructions from the controller 245. The controller 245 may instruct the light source assembly 230 to project pulses of light into a local area, e.g., pulses of light $905_1$, $905_2$, ..., $905_R$, where R is an integer greater than one, as shown in FIG. 9A. For example, the pulses of light $905_1$, $905_2$, ..., $905_R$ may have a specific pulse rate. The projected pulses of light $905_1$, $905_2$, ..., $905_R$ may form a pulse train that repeats in a periodic manner, e.g., R times, where R is greater than one. The number of repetitions, R, may depend on, e.g., a SNR associated with intensities of light stored in the local storage locations of the augmented pixel 310. In some embodiments, the light source assembly 230 includes a plurality of light sources emitting the pulses of light $905_1$, $905_2$, ..., $905_R$. In some other embodiments, the light source assembly 230 includes a single light source configured to emit the pulses of light $905_1$, $905_2$, ..., $905_R$. In addition to the pulses of light $905_1$, $905_2$, ..., $905_R$ illuminating the local area surrounding the DCA, a certain level of ambient light 907 may be also present in the local area. Although the ambient light 907 is illustrated in the timing diagram 902 to have a constant level of intensity over time, the intensity of ambient light 907 may vary over time.

The timing diagram 904 is a pixel timing diagram for an augmented pixel (e.g., the augmented pixel 310) of the imaging device 240. The augmented pixel 310 may operate in accordance with the timing diagram 904 based on e.g., capture instructions from the controller 245. The augmented pixel 310 may be configured to image, over an exposure interval 930, a portion of the local area illuminated with the pulses of light, e.g., the pulses of light $905_1$, $905_2$, ..., $905_R$. The exposure interval 930 may be divided into intervals that include capture intervals and drain intervals, e.g., capture intervals $910_1$, $915_1$, $920_1$, $910_2$, $910_3$, $915_2$, $920_2$, $910_4$, ..., $910_{2R-1}$, $915_R$, $920_R$, $910_R$ and drain intervals 925, as shown in FIG. 9A. The capture intervals $910_1$, $910_3$, ..., $910_{2R-1}$ are synchronized to the pulses of light $905_1$, $905_2$, ..., $905_R$, respectively.

In this embodiment, each augmented pixel 310 includes four gates, e.g., 320A, 320B, 320C, and 320D, where 320A, 320B, and 320C have an associated local storage area, and 320D is a drain. During the capture intervals $910_1$, $910_3, \ldots, 910_{2R-1}$, one of the gates 320A, 320B, 320C (e.g., the gate 320A) may be activated to enable an associated local storage location to store image data (i.e., intensities of light) associated with portions of the pulses of light $905_1$, $905_2, \ldots, 905_R$ reflected from a first portion of the local area corresponding to a first range of distances from the camera assembly. The other gates (e.g., all but 320A) are inactive during the capture intervals $910_1, 910_3, \ldots, 910_{2R-1}$. During the capture intervals $915_1, 915_2, \ldots, 915_R$, one of the gates 320A, 320B, 320C (e.g., the gate 320B) may be activated to enable an associated local storage location to store image data (i.e., intensities of light) associated with portions of the pulses of light $905_1, 905_2, \ldots, 905_R$ reflected from a second portion of the local area corresponding to a second range of distances from the camera assembly, and the second range of distances is farther from the camera assembly than the first range of distances. The other gates (e.g., all but 320B) are inactive during the capture intervals $915_1, 915_2, \ldots, 915_R$. During the capture intervals $920_1, 920_2, \ldots, 920_R$, one of the gates 320A, 320B, 320C (e.g., the gate 320C) may be activated to enable an associated local storage location to store image data (i.e., intensities of light) associated with portions of the pulses of light $905_1, 905_2, \ldots, 905_R$ reflected from a third portion of the local area corresponding to a third range of distances from the camera assembly, and the third range of distances is farther from the camera assembly than the second range of distances. The other gates (e.g., all but 320C) are inactive during the capture intervals $920_1$, $920_2, \ldots, 920_R$.

As illustrated in the timing diagram 904 of FIG. 9A, one of the gates 320A, 320B, 320C (e.g., the gate 320A) is activated more often during the exposure interval 930 than other gates of the augmented pixel 310 (e.g., the gates 320B, 320C), i.e., a number of corresponding capture intervals for that one gate is larger than a number of corresponding capture intervals for each of the other gates of the augmented pixel 310 (e.g., twice larger, as shown in FIG. 9A). Thus, during the capture intervals $910_2, 910_4, \ldots, 910_{2R}$, one of the gates 320A, 320B, 320C (e.g., the gate 320A) may be activated to enable an associated local storage location to store image data (i.e., intensities of light) associated with portions of the pulses of light $905_1, 905_2, \ldots, 905_R$ reflected from a fourth portion of the local area corresponding to a fourth range of distances from the camera assembly, and the fourth range of distances is farther from the camera assembly than the third range of distances. The other gates (e.g., all but 320A) are inactive during the capture intervals $910_2$, $910_4, \ldots, 910_{2R}$. The DCA operating in accordance with the timing diagrams 902, 904 may feature increased depth precision and longer depth imaging range in comparison with, e.g., the DCA operating in accordance with the timing diagrams 702, 704 of FIG. 7A. The increased depth precision and longer depth imaging range is achieved because a specific local storage location (e.g., the one associated with the gate 320A) of each augmented pixel may capture image data corresponding to light reflected from nearest and furthest objects within a full range of the DCA.

Drain intervals 925 occur after the end of capture intervals $910_2, 910_4, \ldots, 910_{2R-2}$. During each of the drain intervals 925, the drain gate 320D of the augmented pixel 310 may be activated so that charges related to any light incident to a surface of the augmented pixel 310 during the drain interval 925 are not recorded. The drain interval 925 may be placed after each capture interval $910_2, 910_4, \ldots, 910_{2R-2}$, to provide some cooling time for the DCA (e.g., the camera assembly 115) between high power pulses of light $905_1$, $905_2, \ldots, 905_R$ designed to overwhelm the ambient light 907. Also, inserting a drain interval 925 after each capture interval $910_2, 910_4, \ldots, 910_{2R-2}$ helps prevent light from objects far away from ending up being detected in a first capture interval in a group of capture intervals (i.e., any of the capture intervals $910_3, \ldots, 910_{2R-1}$). Thus, each drain interval 925 acts to isolate groups of capture intervals from each other. A length of each drain interval 925 may be determined based on an intensity of a corresponding pulse of light $905_1, 905_2, \ldots, 905_R$ such that to provide a sufficient level of cooling for the DCA. Also, a length of each drain interval 925 may be determined based on a desired range of a local area covered by the DCA as the drain interval 912 prevents light from far objects from ending up being detected in a wrong capture interval.

The timing diagram 904 can be replicated for each augmented pixel (e.g., the augmented pixel 310) of the imaging device 240. Corresponding local storage locations of each augmented pixel of the imaging device 240 may store image data associated with the corresponding pulses of light $905_1, 905_2, \ldots, 905_R$. The image data may be stored in the local storage locations of each augmented pixel during corresponding capture intervals of the exposure interval 930.

After the exposure interval 930, e.g., during a read out interval 935, the controller 245 initiates read-out of the image data stored in the local storage locations of each augmented pixel of the imaging device 240. The controller 245 obtains the stored image data and generates a plurality of image data frames. The controller 245 may then determine depth information for the local area, based in part on the plurality of image data frames, e.g., as defined by equations (1)-(5). The controller 245 may further determine information about intensity reconstruction for the local area, based in part on the plurality of image data frames, e.g., as defined by equations (1), (2) and (6).

In some other embodiments, each augmented pixel in a sensor of a DCA (e.g., the augmented pixel 310 of the sensor 300 in the camera assembly 115) may have additional gates (e.g., more than three non-drain gates) for capturing light reflected from different portions of a local area surrounding the DCA. Thus, instead of four capture intervals that are associated with each pulse of light illustrated in FIG. 9A, additional capture intervals would be included into the exposure interval 930 that are associated with each pulse of light emitted from a light source assembly of the DCA.

Figure 9B:
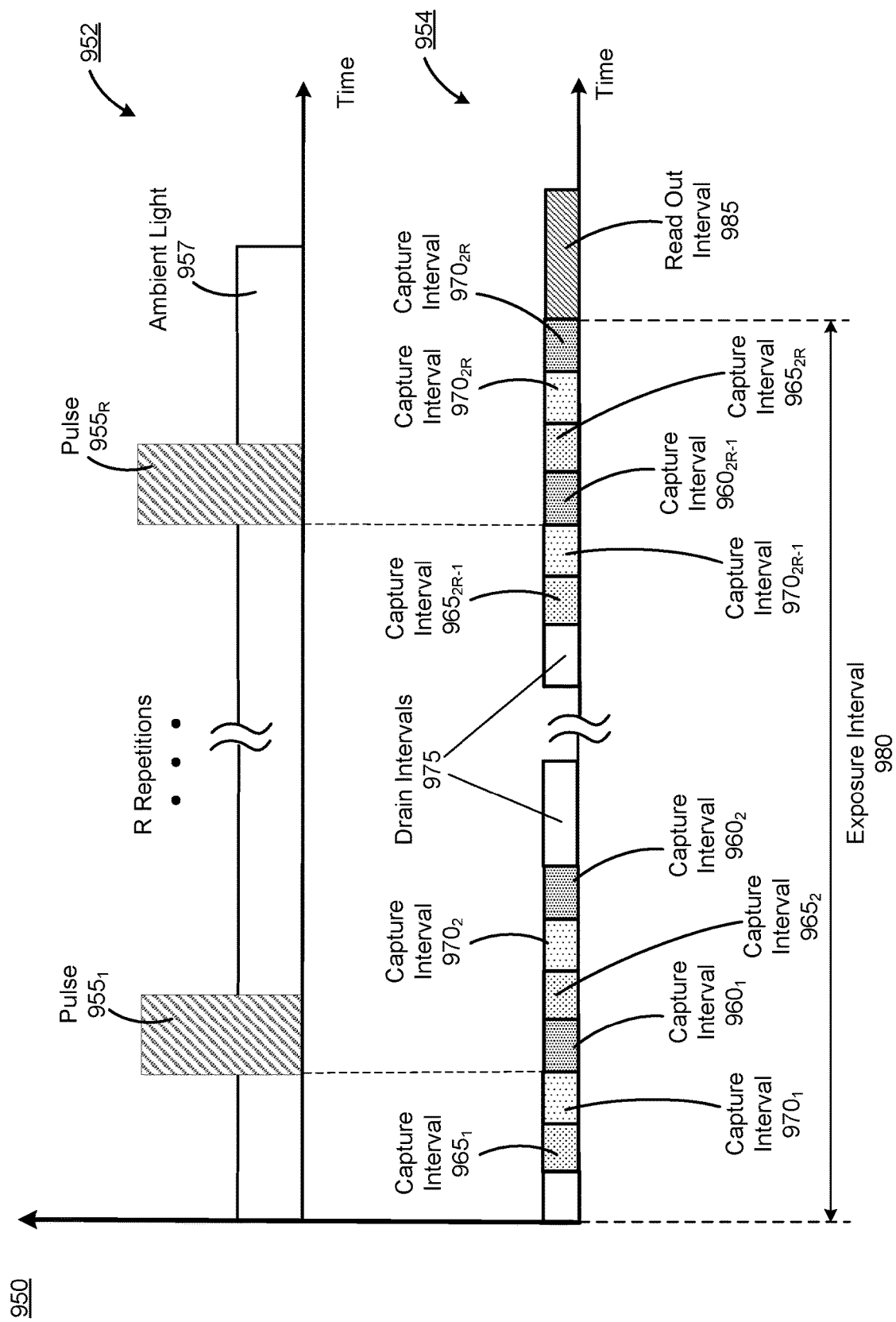
FIG. 9B is an example of timing diagrams for continuous wave time-of-flight operations that include multiple repeating capture intervals in each group of capture intervals, in accordance with one or more embodiments.

FIG. 9B is an example 950 of timing diagrams 952 and 954 for continuous wave time-of-flight operations that include multiple repeating capture intervals in each group of capture intervals, in accordance with one or more embodiments. The DCA operating in accordance with the timing diagrams 952 and 954 may feature improved depth precision, especially in high ambient light conditions.

The timing diagram 952 relates to operation of the light source assembly 230 operating as a continuous wave light source, e.g., based on emission instructions from the controller 245. The controller 245 may instruct the light source assembly 230 to project pulses of light into a local area, e.g., pulses of light $955_1, \ldots, 955_R$, where R is an integer greater than one, as shown in FIG. 9A. For example, the pulses of light $955_1, \ldots, 955_R$ may have a specific pulse rate. The projected pulses of light $955_1, 955_2, \ldots, 955_R$ may form a pulse train that repeats in a periodic manner, e.g., R times, where R is greater than one. The number of repetitions, R, may depend on, e.g., a SNR associated with intensities of light stored in the local storage locations of the augmented pixel 310. In some embodiments, the light source assembly 230 includes a plurality of light sources emitting the pulses of light $955_1, \ldots, 955_R$. In some other embodiments, the light source assembly 230 includes a single light source configured to emit the pulses of light $955_1, \ldots, 955_R$. In addition to the pulses of light $955_1, 955_2, \ldots, 955_R$ illuminating the local area surrounding the DCA, a certain level of ambient light 957 may be also present in the local area. Although the ambient light 957 is illustrated in the timing diagram 952 to have a constant level of intensity over time, the intensity of ambient light 957 may vary over time.

The timing diagram 954 is a pixel timing diagram for an augmented pixel (e.g., the augmented pixel 310) of the imaging device 240. The augmented pixel 310 may operate in accordance with the timing diagram 954 based on e.g., capture instructions from the controller 245. The augmented pixel 310 may be configured to image, over an exposure interval 980, a portion of the local area illuminated with the pulses of light, e.g., the pulses of light $955_1, \ldots, 955_R$. The exposure interval 980 may be divided into intervals that include capture intervals and drain intervals, e.g., capture intervals $960_1, 965_1, 970_1, 960_2, 965_2, 970_2, \ldots, 960_{2R-1}, 965_{2R-1}, 970_{2R-1}, 960_{2R}, 965_{2R}, 970_{2R}$ and drain intervals 975, as shown in FIG. 9B. The capture intervals $960_1, \ldots, 960_{2R-1}$ are synchronized to the pulses of light $955_1, \ldots, 955_R$, respectively.

In this embodiment, each augmented pixel 310 includes four gates, e.g., 320A, 320B, 320C, and 320D, where 320A, 320B, and 320C have an associated local storage area, and 320D is a drain. Note that the timing diagram 954 is the same as the timing diagram 904 of FIG. 9A, except that a pair of capture intervals $965_1, 970_1$ occur before the capture interval $960_1$ synchronized to the pulse of light $955_1$, and so on until a pair of capture intervals $965_{2R-1}, 970_{2R-1}$ occur before the capture interval $960_{2R-1}$ synchronized to the pulse of light $955_R$. Only the gate 320A may be activated during the capture intervals $960_1, \ldots, 960_{2R-1}$; only the gate 320B may be activated during the capture intervals $965_1, 965_2, \ldots, 965_{2R-1}, 965_{2R}$; only the gate 320C may be activated during the capture intervals $970_1, 970_2, \ldots, 970_{2R-1}, 970_{2R}$. It can be observed from the timing diagram 954 that a number of capture intervals within an exposure interval of the DCA associated with each gate is increased, e.g., doubled in comparison with a number of capture intervals within an exposure interval of the DCA operating in accordance with the timing diagram 704 of FIG. 7A. Because of that, the DCA operating in accordance with the timing diagrams 952 and 954 may feature improved depth precision, especially in high ambient light conditions.

The timing diagram 954 can be replicated for each augmented pixel (e.g., the augmented pixel 310) of the imaging device 240. Corresponding local storage locations of each augmented pixel of the imaging device 240 may store image data associated with the corresponding pulses of light $955_1, \ldots, 955_R$. The image data may be stored in the local storage locations of each augmented pixel during corresponding capture intervals of the exposure interval 980.

After the exposure interval 980, e.g., during a read out interval 985, the controller 245 initiates read-out of the image data stored in the local storage locations of each augmented pixel of the imaging device 240. The controller 245 obtains the stored image data and generates a plurality of image data frames. The controller 245 may then determine depth information for the local area, based in part on the plurality of image data frames, e.g., as defined by equations (1)-(5). The controller 245 may further determine information about intensity reconstruction for the local area, based in part on the plurality of image data frames, e.g., as defined by equations (1), (2) and (6).

In some other embodiments, each augmented pixel in a sensor of a DCA (e.g., the augmented pixel 310 of the sensor 300 in the camera assembly 115) may have additional gates (e.g., more than three non-drain gates) for capturing light reflected from different portions of a local area surrounding the DCA. Thus, instead of six capture intervals that are associated with each pulse of light illustrated in FIG. 9B, additional capture intervals would be included into the exposure interval 980 that are associated with each pulse of light emitted from a light source assembly of the DCA.

Figure 10:
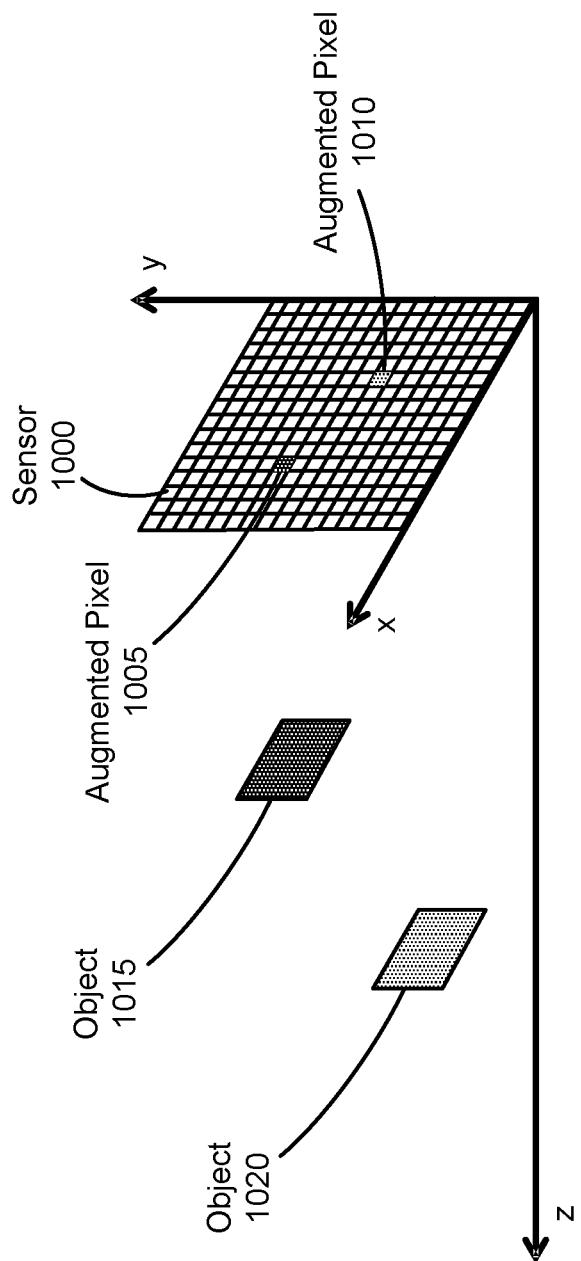
FIG. 10 illustrates a sensor of a camera assembly performing a mix of time-of-flight and HDR operations, in accordance with one or more embodiments.

FIG. 10 illustrates a sensor 1000 of a DCA (e.g., the camera assembly 115) performing a mix of time-of-flight and HDR operations, in accordance with one or more embodiments. The sensor 1000 may be part of the imaging device 240 of FIG. 2. The sensor 1000 may be an embodiment of the sensor 300 of FIG. 3A. An augmented pixel 1005 of the sensor 1000 images at least a portion of an object 1015 in a local area of the sensor 1000. Also, another augmented pixel 1010 of the sensor 1000 images at least a portion of an object 1020 in the local area. Each augmented pixel 1005, 1010 may be an embodiment of the augmented pixel 310 of FIG. 3B.

The objects 1015, 1020 are located at different distances (e.g., along z dimension) from the sensor 1000. In the illustrated example, the object 1020 is located farther from the sensor 1000 than the object 1015 from the sensor 1000. As the objects 1015 and 1020 are located at different distances from their respective augmented pixels 1005, 1010, a relative brightness of the objects 1015 and 1020 observed by their respective augmented pixels 1005, 1010 may be also different. For example, as the object 1020 is located further from its respective augmented pixel of the sensor 1000 than the object 1015, a level of brightness associated with the object 1020 observed by the augmented pixel 1010 may be lower than a level of brightness associated with the object 1015 observed by the augmented pixel 1005.

In some embodiment, the DCA (e.g., the camera assembly 115) may operate such that an exposure interval for each augmented pixel (e.g., augmented pixel 310) is not the same and pre-determined, but dynamically adjustable based on a distance and/or a level of brightness of an object in a local area at least partially imaged by that augmented pixel. For example, an exposure interval of the augmented pixel 1005 may be shorter than an exposure interval of the augmented pixel 1010. The object 1015 imaged by the augmented pixel 1005 is closer and may appear brighter than the object 1020 images by the augmented pixel 1010. Because of that, a shorter exposure interval for the augmented pixel 1005 may provide a sufficiently high SNR of captured light reflected from the object 1015, whereas only a longer duration of an exposure interval for the augmented pixel 1010 may provide a sufficiently high SNR of captured light reflected from the object 1020. More details about controlling operation of the DCA and adjusting an exposure interval for each augmented pixel are provided in conjunction with FIGS. 11A-11B.

Figure 11A:
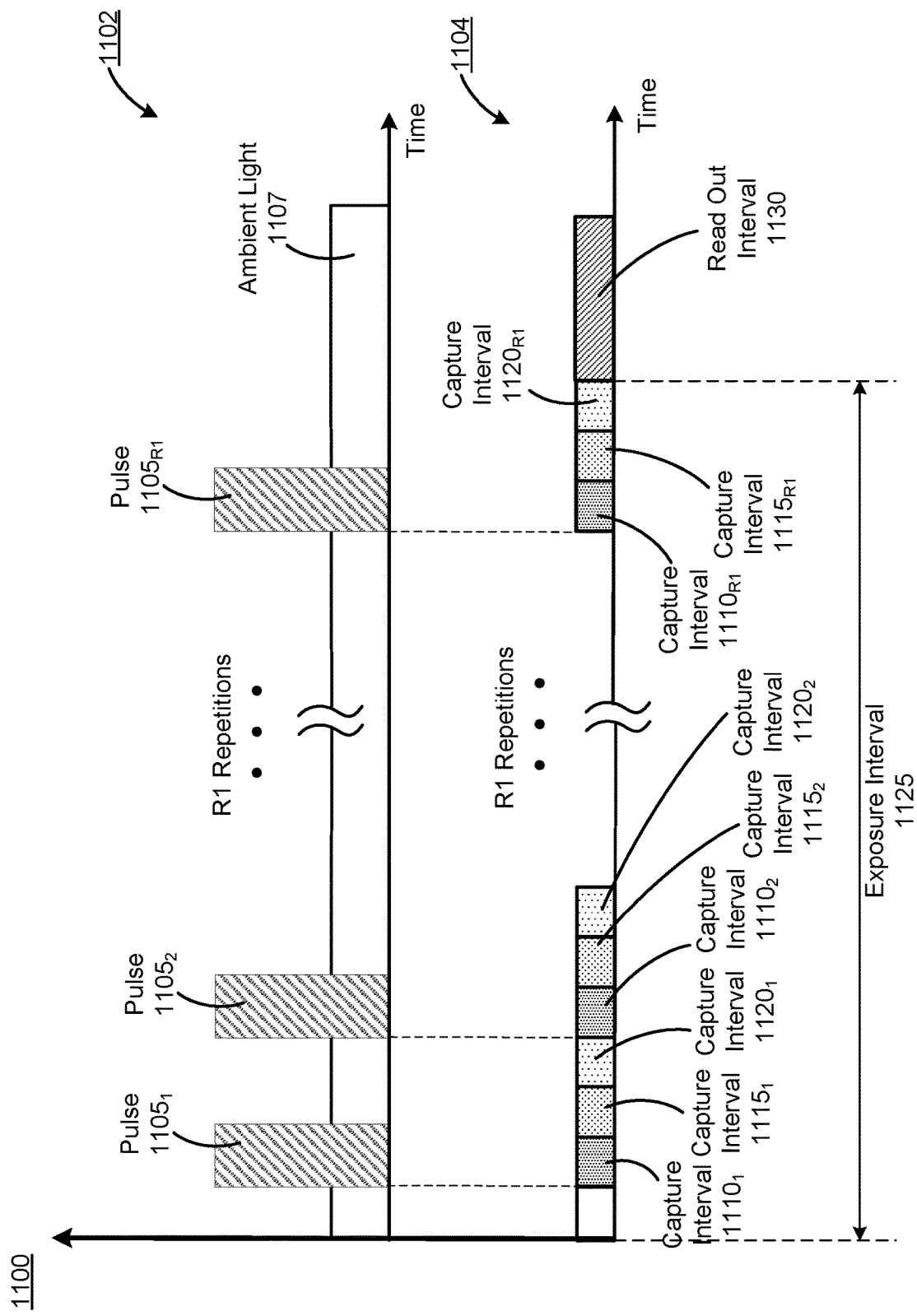
FIG. 11A is an example of timing diagrams for mixed operation for one augmented pixel of a sensor, in accordance with one or more embodiments.

FIG. 11A is an example 1100 of timing diagrams 1102 and 1104 for mixed operation, according to one or more embodiments. The timing diagrams 1102 and 1104 relate to an embodiment for operating one augmented pixel of a DCA (e.g., the camera assembly 115) as part of depth sensing of a local area. For example, the timing diagrams 1102 and 1104 may relate to an embodiment for operating the augmented pixel 1005 of the sensor 1000 in FIG. 10. The timing diagrams 1102 and 1104 relate to the mixed operation of the augmented pixel 1005 that combines time-of-flight depth sensing with high dynamic range imaging.

The timing diagram 1102 relates to operation of the light source assembly 230, e.g., based on emission instructions from the controller 245. The controller 245 may instruct the light source assembly 230 to project pulses of light into a local area, e.g., pulses of light $1105_1$, $1105_2$, ..., $1105_{R1}$, where R1 is an integer greater than one, as shown in FIG. 11A. For example, the pulses of light $1105_1$, $1105_2$, ..., $1105_{R1}$ may have a specific pulse rate. In some embodiments, the light source assembly 230 includes a plurality of light sources emitting the pulses of light $1105_1$, $1105_2$, ..., $1105_{R1}$. In some other embodiments, the light source assembly 230 includes a single light source configured to emit the pulses of light $1105_1$, $1105_2$, ..., $1105_{R1}$. In addition to the pulses of light $1105_1$, $1105_2$, ..., $1105_{R1}$ illuminating the local area surrounding the DCA, a certain level of ambient light 1107 may be also present in the local area. Although the ambient light 1107 is illustrated in the timing diagram 1102 to have a constant level of intensity over time, the intensity of ambient light 1107 may vary over time.

The timing diagram 1104 is a pixel timing diagram for an augmented pixel (e.g., the augmented pixel 1005). The augmented pixel 1005 may operate in accordance with the timing diagram 1104 based on e.g., capture instructions from the controller 245. The augmented pixel 1005 may be configured to image, over an exposure interval 1125, a portion of the local area illuminated with the pulses of light, e.g., the object 1015 illuminated by the pulses of light $1105_1$, $1105_2$, ..., $1105_{R1}$. The exposure interval 1125 may be divided into intervals that include capture intervals, e.g., capture intervals $1110_1$, $1115_1$, $1120_1$, $1110_2$, $1115_2$, $1120_2$, ..., $1110_{R1}$, $1115_{R1}$, $1120_{R1}$, as shown in FIG. 11A. The capture intervals $1110_1$, $1110_2$, ..., $1110_{R1}$ are synchronized to the pulses of light $1105_1$, $1105_2$, ..., $1105_{R1}$, respectively.

In this embodiment, the augmented pixel 1005 includes three gates, e.g., 320A, 320B, and 320C. During the capture intervals $1110_1$, $1110_2$, ..., $1110_{R1}$, one of the gates 320A, 320B, 320C of the augmented pixel 1005 (e.g., the gate 320A) may be activated to enable an associated local storage location to store image data (i.e., intensities of light) associated with portions of the pulses of light $1105_1$, $1105_2$, ..., $1105_{R1}$ reflected from a first portion of the local area corresponding to a first range of distances from the camera assembly. The other gates (e.g., all but 320A) are inactive during the capture intervals $1110_1$, $1110_2$, ..., $1110_{R1}$. During the capture intervals $1115_1$, $1115_2$, ..., $1115_{R1}$, one of the gates 320A, 320B, 320C of the augmented pixel 1005 (e.g., the gate 320B) may be activated to enable an associated local storage location to store image data (i.e., intensities of light) associated with portions of the pulses of light $1105_1$, $1105_2$, ..., $1105_{R1}$ reflected from a second portion of the local area corresponding to a second range of distances from the camera assembly, and the second range of distances is farther from the camera assembly than the first range of distances. The other gates (e.g., all but 320B) are inactive during the capture intervals $1115_1$, $1115_2$, ..., $1115_{R1}$. During the capture intervals $1120_1$, $1120_2$, ..., $1120_{R1}$, one of the gates 320A, 320B, 320C of the augmented pixel 1005 (e.g., the gate 320C) may be activated to enable an associated local storage location to store image data (i.e., intensities of light) associated with portions of the pulses of light $1105_1$, $1105_2$, ..., $1105_{R1}$ reflected from a third portion of the local area corresponding to a third range of distances from the camera assembly, and the third range of distances is farther from the camera assembly than the second range of distances. The other gates (e.g., all but 320C) are inactive during the capture intervals $1120_1$, $1120_2$, ..., $1120_{R1}$.

As shown in the timing diagram 1102 of FIG. 11A, the projected pulses of light $1105_1$, $1105_2$, ..., $1105_{R1}$ may form a pulse train that repeats in a periodic manner, e.g., R1 times, where R1 is greater than one. Also, as shown in the timing diagram 1104 of FIG. 11A, the group of capture intervals associated with all three gates of the augmented pixel 1005 are repeated R1 times to capture image data related to light reflected from the object 1010. In some embodiments, the controller 245 of the camera assembly 115 assigns and dynamically adjusts the number of repetitions R1 based on a distance between the augmented pixel 1005 and the object 1015 imaged at least partially by the augmented pixel 1005. The controller 245 may obtain information about the distance of the object 1015 using, e.g., previously captured image data of the object 1015. Additionally or alternatively, the controller 245 assigns and dynamically adjusts the number of repetitions R1 based on information about a perceived brightness of the object 1015 imaged at least partially by the augmented pixel 1005. The controller 245 may determine the perceived brightness of the object 1015 the augmented pixel 1005 based on, e.g., image data stored in local storage locations of the augmented pixel 1005 during an exposure interval of the augmented pixel 1005 preceding the exposure interval 1125.

After the exposure interval 1125, e.g., during a read out interval 1130, the controller 245 initiates read-out of the image data stored in the local storage locations of the augmented pixel 1005. The controller 245 obtains the stored image data and determines depth information for the object 1015, based in part on the stored image data, e.g., as defined by equations (1)-(5). The controller 245 may further determine information about intensity reconstruction for the object 1015, based in part on the stored image data, e.g., as defined by equations (1), (2) and (6).

In some other embodiments, the augmented pixel 1005 may have additional gates (e.g., more than three non-drain gates) for capturing light reflected from different portions of a local area surrounding the DCA. Thus, instead of three capture intervals that are associated with each pulse of light illustrated in FIG. 11A, additional capture intervals would be included into the exposure interval 1125 that are associated with each pulse of light emitted from a light source assembly of the DCA.

Figure 11B:
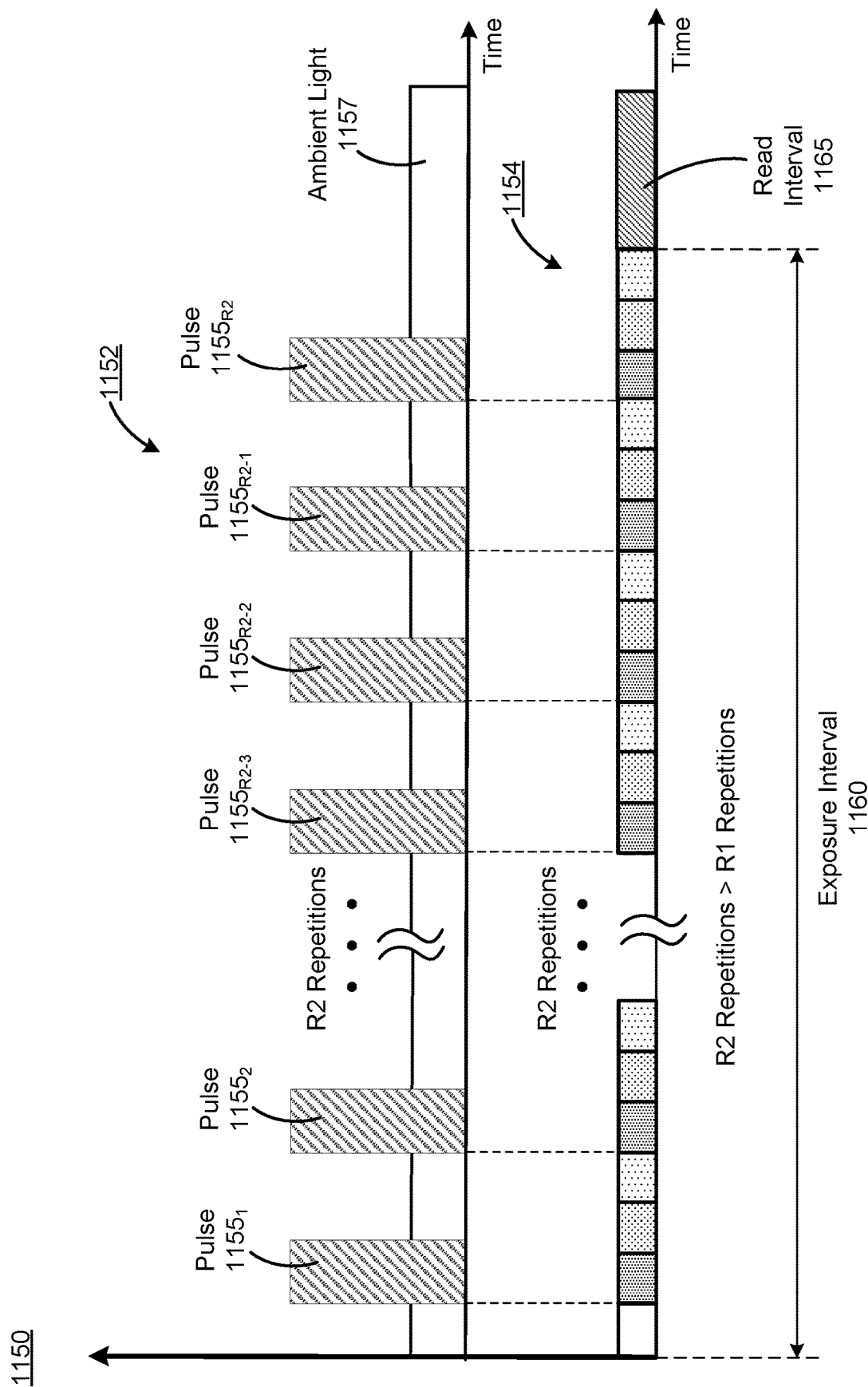
FIG. 11B is an example of timing diagrams for mixed operation for another augmented pixel of the sensor, in accordance with one or more embodiments.

FIG. 11B is an example 1150 of timing diagrams 1152 and 1154 for mixed operation for another augmented pixel, in accordance with one or more embodiments. The timing diagrams 1152 and 1154 relate to an embodiment for operating one augmented pixel of a DCA (e.g., the camera assembly 115) as part of depth sensing of a local area. For example, the timing diagrams 1152 and 1154 may relate to an embodiment for operating the augmented pixel 1010 of the sensor 1000 in FIG. 10. The timing diagrams 1152 and 1154 relate to the mixed operation of the augmented pixel 1010 that combines time-of-flight depth sensing with high dynamic range imaging.

The timing diagram 1152 relates to operation of the light source assembly 230, e.g., based on emission instructions from the controller 245. The controller 245 may instruct the light source assembly 230 to project pulses of light into a local area, e.g., pulses of light $1155_1$, $1155_2$, ..., $1155_{R2-3}$, $1155_{R2-2}$, $1155_{R2-1}$, $1155_{R2}$, where R2 is an integer greater than one, as shown in FIG. 11B. For example, the pulses of light $1155_1$, $1155_2$, ..., $1155_{R2-3}$, $1155_{R2-2}$, $1155_{R2-1}$, $1155_{R2}$ may have a specific pulse rate. In some embodiments, the light source assembly 230 includes a plurality of light sources emitting the pulses of light $1155_1$, $1155_2$, ..., $1155_{R2-3}$, $1155_{R2-2}$, $1155_{R2-1}$, $1155_{R2}$. In some other embodiments, the light source assembly 230 includes a single light source configured to emit the pulses of light $1155_1$, $1155_2$, ..., $1155_{R2-3}$, $1155_{R2-2}$, $1155_{R2-1}$, $1155_{R2}$. In addition to the pulses of light $1155_1$, $1155_2$, ..., $1155_{R2-3}$, $1155_{R2-2}$, $1155_{R2-1}$, $1155_{R2}$ illuminating the local area surrounding the DCA, a certain level of ambient light 1157 may be also present in the local area. Although the ambient light 1157 is illustrated in the timing diagram 1152 to have a constant level of intensity over time, the intensity of ambient light 1157 may vary over time.

The timing diagram 1154 is a pixel timing diagram for an augmented pixel (e.g., the augmented pixel 1010). The augmented pixel 1010 may operate in accordance with the timing diagram 1104 based on e.g., capture instructions from the controller 245. The augmented pixel 1005 may be configured to image, over an exposure interval 1160, a portion of the local area illuminated with the pulses of light, e.g., the object 1020 illuminated by the pulses of light $1155_1$, $1155_2$, ..., $1155_{R2-3}$, $1155_{R2-2}$, $1155_{R2-1}$, $1155_{R2}$. The exposure interval 1160 may be divided into intervals that include capture intervals during which corresponding gates of the augmented pixel 1010 are activated to enable associated local storage locations to store image data. Note that the timing diagram 1154 includes R2 repetitions of the capture intervals, each repetition of the capture intervals associated with capturing image data in local storage locations of different gates of the augmented pixel 1010. One repetition of the capture intervals in the timing diagram 1154 is identical as one repetition of the capture intervals of the timing diagram 1104 of FIG. 11A. The difference between the timing diagrams 1152, 1154 and corresponding timing diagrams 1102, 1104 is the number of repetitions R2 that is different than R1 due to different distances and/or perceived brightness of objects imaged by the corresponding augmented pixels 1005, 1010.

In some embodiments, the controller 245 of the camera assembly 115 assigns and dynamically adjusts the number of repetitions R2, based on a distance between the augmented pixel 1010 and the object 1020 imaged at least partially by the augmented pixel 1010. The controller 245 may obtain information about the distance of the object 1020 using previously captured image data associated with light reflected from the object 1020. As the object 1020 is positioned further from the augmented pixel 1010 than the object 1015 from the augmented pixel 1005, the controller 245 may assign R2 to be larger than R1. Additionally or alternatively, the controller 245 may assign the number of repetitions R2 for the augmented pixel 1010, based on information about a perceived brightness of the object 1020 imaged at least partially by the augmented pixel 1010. The controller 245 may determine the brightness of the object 1020 perceived at the augmented pixel 1010 based on, e.g., image data stored in local storage locations of the augmented pixel 1010 during an exposure interval preceding the exposure interval 1160. As a relative level of brightness of the object 1020 observed by the augmented pixel 1010 may be lower than a relative level of brightness of the object 1015 observed by the augmented pixel 1005, the controller 245 may assign R2 to be larger than R1.

After the exposure interval 1160, e.g., during a read out interval 1165, the controller 245 initiates read-out of the image data stored in the local storage locations of the augmented pixel 1010. The controller 245 obtains the stored image data and determines depth information for the object 1020, based in part on the stored image data, e.g., as defined by equations (1)-(5). The controller 245 may further determine information about intensity reconstruction for the object 1020, based in part on the stored image data, e.g., as defined by equations (1), (2) and (6). As exposure intervals are different for different augmented pixels that image different objects in a local area, the DCA (e.g., the camera assembly 115) can be configured to perform time-of-flight depth sensing with a dynamic range that is higher than that of conventional time-of-flight DCAs.

In some other embodiments, the augmented pixel 1010 may have additional gates (e.g., more than three non-drain gates) for capturing light reflected from different portions of a local area surrounding the DCA. Thus, instead of three capture intervals that are associated with each pulse of light illustrated in FIG. 11B, additional capture intervals would be included into the exposure interval 1160 that are associated with each pulse of light emitted from a light source assembly of the DCA.

Figure 12:
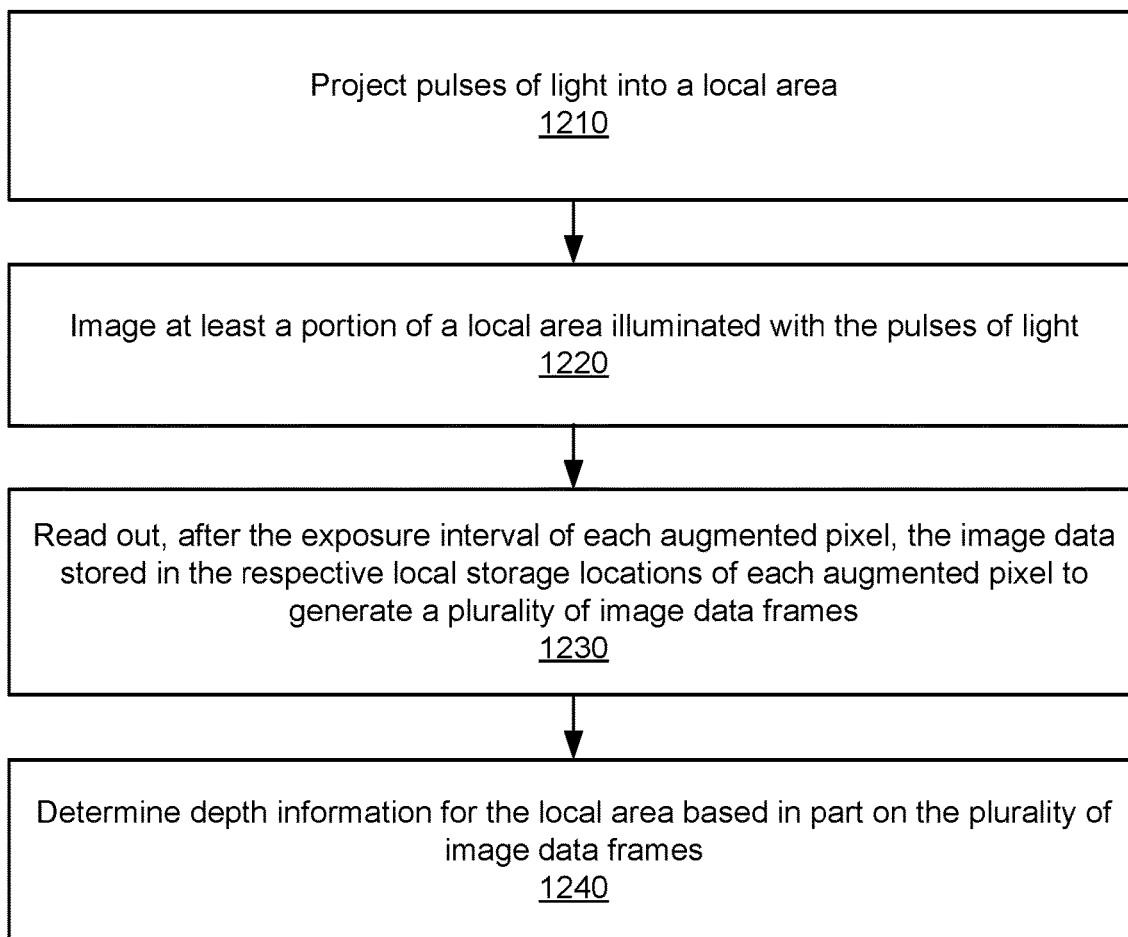
FIG. 12 is a flow chart illustrating a process of determining depth information for a local area, in accordance with one or more embodiments.

FIG. 12 is a flow chart illustrating a process of determining depth information for a local area, which may be implemented at the headset 100 shown in FIG. 1, in accordance with one or more embodiments. The process 1200 of FIG. 12 may be performed by the components of a camera assembly, e.g., the camera assembly 115 of FIGS. 1-2. Other entities (e.g., a headset and/or console) may perform some or all of the steps of the process in other embodiments. Likewise, embodiments may include different and/or additional steps, or perform the steps in different orders.

The camera assembly projects 1210 (e.g., via a light source assembly) pulses of light into a local area. In embodiments when the light source assembly operates as a continuous wave light source assembly, the projected pulses of light form a pulse train that repeats in a periodic manner, as disclosed in conjunction with FIG. 6, FIG. 8, and FIGS. 9A-9B. In other embodiments when the light source assembly operates as a pulsed phasor light source assembly, the light source assembly emits a set of individual pulses of light that may or may not be periodic, as disclosed in conjunction with FIGS. 7A-7B. The camera assembly may adjust (e.g., via a controller) a duration of each of the projected pulses based on an amount of ambient light detected by the camera assembly.

The camera assembly images 1220 (e.g., via an imaging device) at least a portion of a local area illuminated with the pulses of light, e.g., the pulses of light illustrated in FIG. 6, FIGS. 7A-7B, FIG. 8, and FIGS. 9A-9B. The camera assembly includes a plurality of augmented pixels (e.g., augmented pixels 310 of the sensor 300 in FIG. 3A, augmented pixels 1005, 1010 of the sensor 1000 in FIG. 10), each augmented pixel having a plurality of gates and at least some of the gates have a respective local storage location. In some embodiments, one or more of the plurality of gates comprises a drain gate. An exposure interval of each augmented pixel may be divided into intervals that are associated with the gates, and each local storage location stores image data during a respective interval, as described in conjunction with FIG. 6, FIGS. 7A-7B, FIG. 8, FIGS. 9A-9B, and FIGS. 11A-11B. In some embodiments, the intervals include capture intervals and drain intervals, as shown in FIGS. 7A-7B and FIGS. 9A-9B. The camera assembly may enable (e.g., via the controller), during a drain interval between two capture intervals, activation of the drain gate. The camera assembly may adjust (e.g., via the controller) a duration of each of the intervals of the exposure interval based on the amount of ambient light.

In some embodiment, the intervals within the exposure interval include a first number of intervals associated with a first gate of the plurality of gates, and a second number of intervals associated with a second gate of the plurality gates, and the first number is different than the second number, as described in conjunction with FIG. 9A. In some embodiments, the gates also include a third gate and a drain, and the intervals within the exposure interval includes a third number of intervals associated with the third gate, and the second number and the third number are the same, as described in conjunction with FIG. 9A. In some embodiments, a first exposure interval of a first augmented pixel of the plurality of augmented pixels is different than a second exposure interval of a second augmented pixel of the plurality of augmented pixels, described in conjunction with FIGS. 11A-11B.

In some embodiments, as discussed in conjunction with FIG. 10 and FIGS. 11A-11B, the camera assembly assigns (e.g., via the controller) a number of intervals for repetition within the exposure interval for each augmented pixel, based on a distance between the camera assembly and at least one object in the local area imaged at least partially by that augmented pixel. In some other embodiments, as discussed in conjunction with FIG. 10 and FIGS. 11A-11B, the camera assembly assigns (e.g., via the controller) a number of intervals for repetition within the exposure interval for each augmented pixel, based on a brightness of at least one object in the local area imaged at least partially by that augmented pixel.

The camera assembly reads out 1230 (e.g., via the controller), after the exposure interval of each augmented pixel, the image data stored in the respective local storage locations of each augmented pixel to generate a plurality of image data frames. In some embodiments, the read out image data include information about a plurality of light intensities stored in the respective local storage locations. The approach presented herein based on a single interval for reading out the stored image data allows faster operation of the camera assembly in comparison with conventional cameras while achieving a high dynamic range.

The camera assembly determines 1240 (e.g., via the controller) depth information for the local area based in part on the plurality of image data frames. The camera assembly may determine (e.g., via the controller) a phase of light captured at that augmented pixel, based on the image data stored in the respective local storage locations, as defined by equation (3) or equation (7). The camera assembly may determine (e.g., via the controller) a difference between a first of the light intensities and a second of the light intensities, an additional difference between a third of the light intensities and a fourth of the light intensities, and a phase of light captured at that augmented pixel, based on a ratio of the difference to the additional difference, as defined by equation (7). The camera assembly may determine (e.g., via the controller) the phase as an arctangent of the difference to the additional difference, as defined by equation (7). The camera assembly may determine (e.g., via the controller) the depth information based in part on the determined phase, as defined by equation (4) or equation (5).

Differential Imaging

Figure 13A:
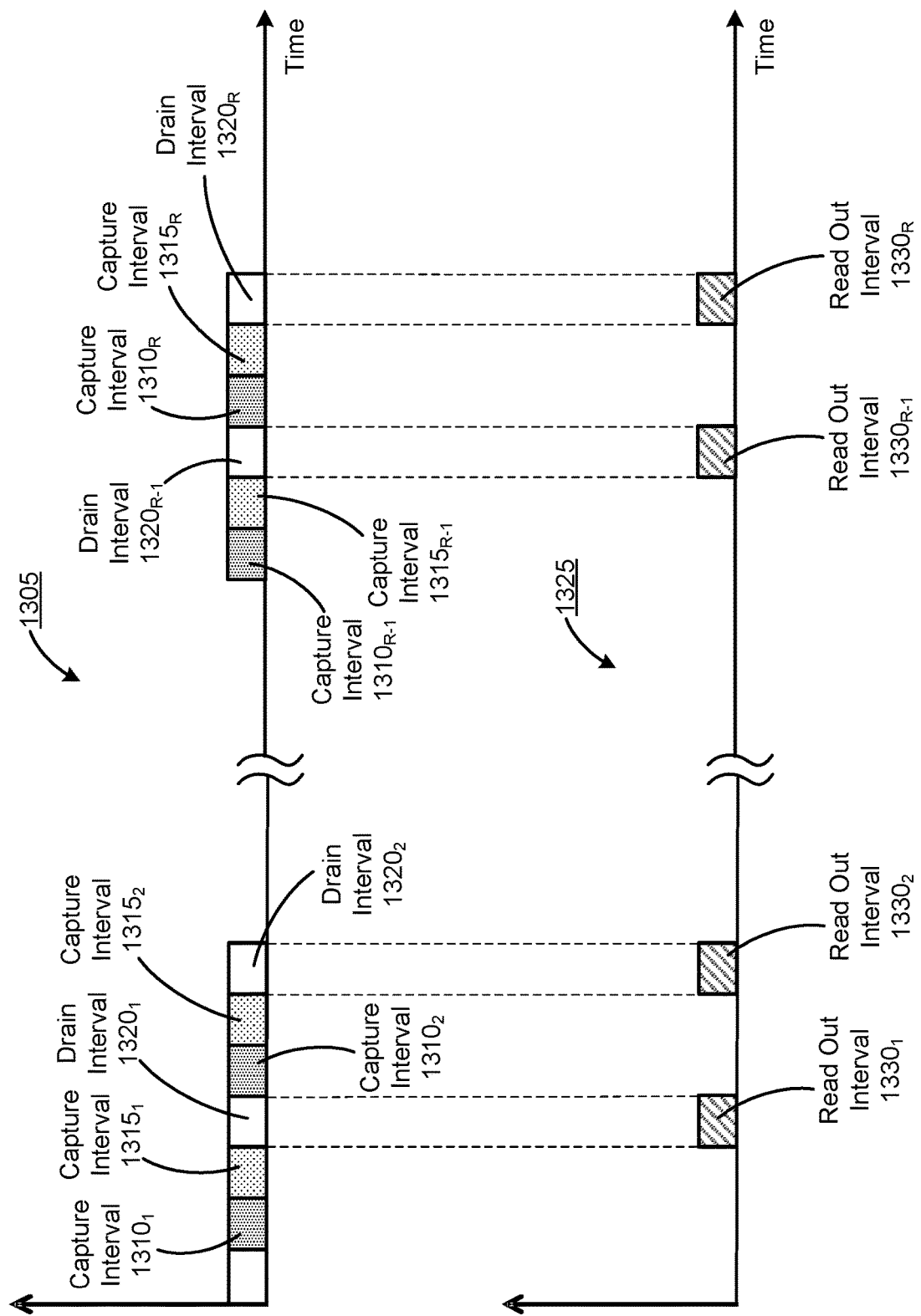
FIG. 13A is an example of timing diagrams for differential operation, in accordance with one or more embodiments.

FIG. 13A is an example of timing diagrams 1305 and 1325 for differential operation, in accordance with one or more embodiments. The timing diagrams 1305, 1325 relate to the differential operation of a camera assembly (e.g., the camera assembly 115) for generating differential images of a local area based on determining a difference between image data captured during consecutive time periods.

The timing diagram 1305 is a pixel timing diagram for an augmented pixel (e.g., the augmented pixel 310) of the imaging device 240. The augmented pixel may include at least a first gate (e.g., the gate 320A) with a first local storage location, a second gate (e.g., the gate 320B) with a second local storage location, and a drain gate (e.g., the gate 320D) without any local storage location. The augmented pixel may be configured to image at least a portion of the local area during an exposure interval, e.g., based on capturing ambient light in the local area. The exposure interval may be divided into intervals that include capture intervals and drain intervals, e.g., capture intervals $1310_1$, $1315_1$, $1310_2$, $1315_2$, ..., $1310_{R-1}$, $1315_{R-1}$, $1310_R$, $1315_R$ and drain intervals $1320_1$, $1320_2$, $1320_{R-1}$, $1320_R$, as shown in FIG. 13A.

During the capture intervals $1310_1$, $1310_2$, ..., $1310_{R-1}$, $1310_R$, the first gate (e.g., the gate 320A) may be activated to enable an associated first local storage location to store first image data of the local area. The other gates (e.g., all but 320A) are inactive during the capture intervals $1310_1$, $1310_2$, ..., $1310_{R-1}$, $1310_R$. During the capture intervals $1315_1$, $1315_2$, ..., $1315_{R-1}$, $1315_R$, the second gate (e.g., the gate 320B) may be activated to enable an associated second local storage location to store second image data of the local area. The other gates (e.g., all but 320B) are inactive during the capture intervals $1310_1$, $1310_2$, ..., $1310_{R-1}$, $1310_R$. As further shown in FIG. 13A, drain intervals $1320_1$, $1320_2$, ..., $1320_{R-1}$, $1320_R$ occur between two capture intervals. During each of the drain intervals $1320_1$, $1320_2$, ..., $1320_{R-1}$, $1320_R$, the drain gate (e.g., the gate 320D) may be activated so that charges related to any light incident to a surface of the augmented pixel 310 during the drain intervals $1320_1$, $1320_2$, ..., $1320_{R-1}$, $1320_R$ are not recorded (e.g., may be shunted to ground).

The timing diagram 1325 is another pixel timing diagram for the augmented pixel that shows a plurality of read out intervals $1330_1$, $1330_2$, ..., $1330_{R-1}$, $1330_R$ that coincide in time with the drain intervals $1320_1$, $1320_2$, ..., $1320_{R-1}$, $1320_R$ of the timing diagram 1305. During each read out intervals $1330_1$, $1330_2$, ..., $1330_{R-1}$, $1330_R$, the camera assembly (e.g., via the controller 245) determines and reads out a difference between the first image data stored in the first local storage location of the augmented pixel and the second image data stored in the second local storage location of the augmented pixel. The read out difference captures changes in the local area occurring during consecutive capture intervals. If there are no changes occurring during the consecutive capture intervals—nothing is read out. Advantages of determining and reading out differential image data is that it requires less bandwidth, it is faster due to reduced bandwidth, requires less memory for storage of image data, etc.

The timing diagrams 1305, 1325 can be replicated for each augmented pixel (e.g., each augmented pixel 310) of the imaging device 240. For each augmented pixel, corresponding local storage locations may store first and second image data during corresponding capture intervals, and a difference between the first image data and the second image data may be determined and read out during corresponding read out intervals. The camera assembly (e.g., the camera assembly 115) may use the read out difference for each augmented pixel to generate a differential image for the portion of the local area. The differential image may be stored in a memory of the camera assembly and/or a storage device. Note that the differential image generally uses a smaller amount of memory size than a conventional image (e.g., full color data for each pixel), which may also facilitate faster data transfer.

In some embodiments, the camera assembly reads out (e.g., via the controller 245), for each augmented pixel, the first image data as a conventional first image of the portion of the local area. The camera assembly may store the first image in the memory of the camera assembly and/or the storage device. The camera assembly may then determine a plurality of differential images using the first image. The camera assembly can use the stored first image and the differential images (e.g., between one and three differential images) to update the first image and generate an image of the portion of the local area having a desired dynamic range that is higher than a dynamic range of the first image. In some embodiments, the camera assembly may compare (e.g., via the controller 245), for each augmented pixel, the read out difference with a threshold difference, and assign a binary value for each augmented pixel based on the comparison, thus further reducing a memory size requirement while facilitating data transfer.

Figure 13B:
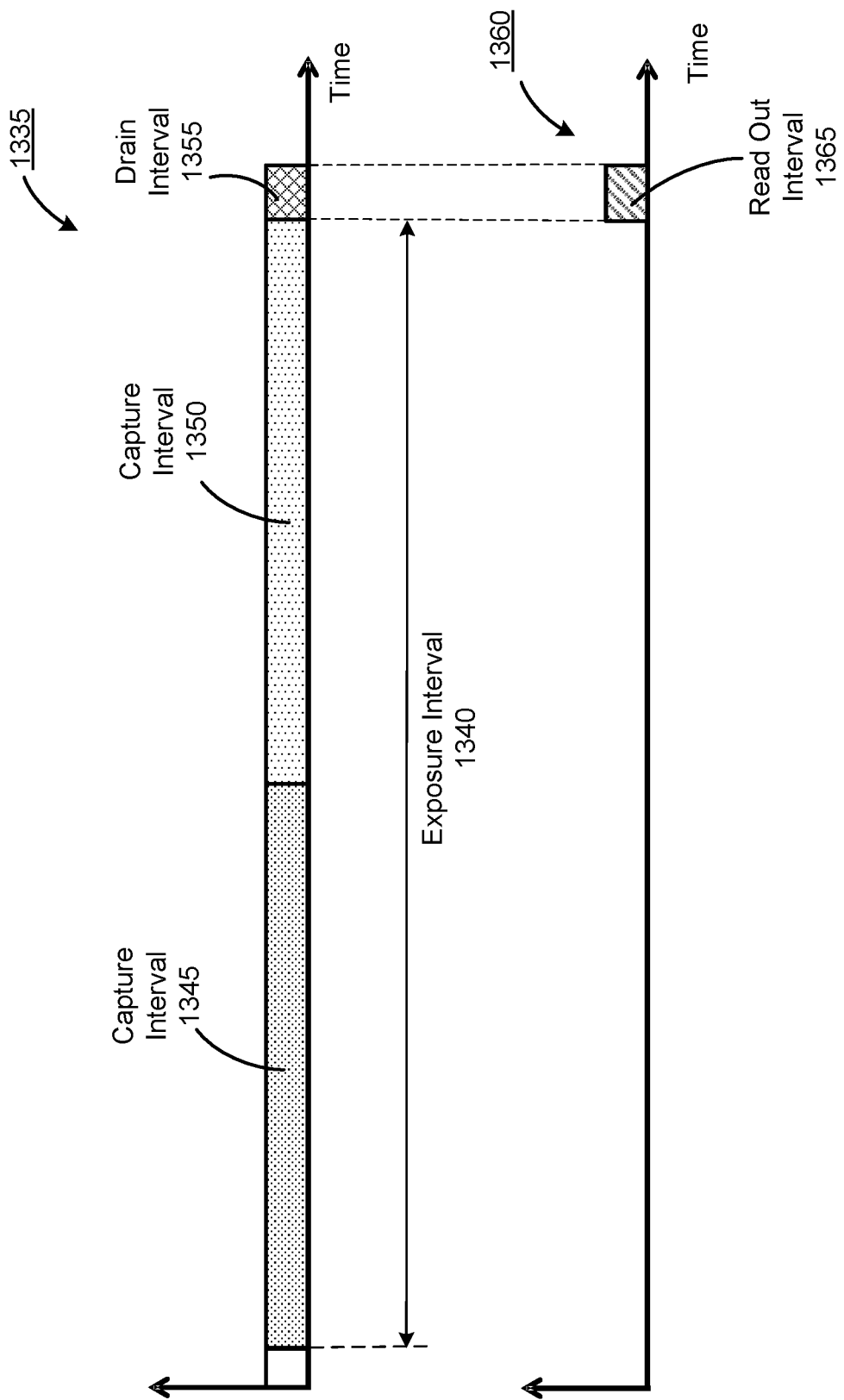
FIG. 13B is another example of timing diagrams for differential operation, in accordance with one or more embodiments.

FIG. 13B an example of timing diagrams 1335 and 1360 for differential operation, in accordance with one or more embodiments. The timing diagrams 1335, 1360 relate to another embodiment for operating a camera assembly (e.g., the camera assembly 115) to generate differential images of a local area.

The timing diagram 1335 is a pixel timing diagram for an augmented pixel (e.g., the augmented pixel 310) of the imaging device 240. The augmented pixel may include at least a first gate (e.g., the gate 320A) with a first local storage location, a second gate (e.g., the gate 320B) with a second local storage location, and a drain gate (e.g., the gate 320D) without any local storage location. The augmented pixel may be configured to image at least a portion of the local area during an exposure interval 1340 of the camera assembly. The exposure interval 1340 may be divided into capture intervals, e.g., capture intervals 1345, 1350, followed by a drain interval 1355, as shown in FIG. 13B. During the capture interval 1345, the first gate (e.g., the gate 320A) may be activated to enable an associated first local storage location to store first image data. The other gates (e.g., all but 320A) are inactive during the capture interval 1345. During the capture interval 1350, the second gate (e.g., the gate 320B) may be activated to enable an associated second local storage location to store second image data. The other gates (e.g., all but 320B) are inactive during the capture interval 1350. During the drain interval 1355 following the capture intervals 1345, 1350, the drain gate (e.g., the gate 320D) may be activated so that charges related to any light incident to a surface of the augmented pixel 310 during the drain interval 1355 are not recorded (e.g., may be shunted to ground).

The timing diagram 1360 is another pixel timing diagram for the augmented pixel 310 of the imaging device 240 that shows a read out interval 1365 that coincides in time with the drain interval 1355. During the read out interval 1365, the camera assembly (e.g., via the controller 245) determines and reads out a difference between the first image data stored in the first local storage location of the augmented pixel and the second image data stored in the second local storage location of the augmented pixel.

The timing diagrams 1335, 1360 can be replicated for each augmented pixel (e.g., each augmented pixel 310) of the imaging device 240. For each augmented pixel, corresponding local storage locations may store first and second image data during corresponding capture intervals. After the exposure interval 1340 for each augmented pixel, a difference between the first image data and the second image data may be determined and read out during a read out interval that follows the capture intervals. Note that a duration of the exposure interval 1340 may depend on, e.g., a SNR associated with the first and second image data stored in the first and second local storage locations of each augmented pixel. The camera assembly may use the read out difference for each augmented pixel to generate a differential image for the portion of the local area.

FIG. 14 is a flow chart illustrating a process 1400 of generating differential images for a local area, which may be implemented at the headset 100 shown in FIG. 1, in accordance with one or more embodiments. The process 1400 of FIG. 14 may be performed by the components of a camera assembly, e.g., the camera assembly 115 of FIGS. 1-2. Other entities (e.g., a headset and/or console) may perform some or all of the steps of the process in other embodiments. Likewise, embodiments may include different and/or additional steps, or perform the steps in different orders.

The camera assembly images 1410 at least a portion of a local area. The camera assembly images the portion of the local area using a sensor of a camera (e.g., the imaging device 240). The sensor includes a plurality of augmented pixels (e.g., the augmented pixels 310 of the sensor 300 in FIG. 3A), each augmented pixel having at least a first gate with a first local storage location, a second gate with a second local storage location, and a drain gate. An exposure interval of the sensor may be divided into intervals (e.g., capture intervals and one or more drain intervals), as shown in FIGS. 13A-13B. The first local storage location may store first image data during a first of the intervals, and the second local storage location may store second image data during a second of the intervals.

Figure 15:
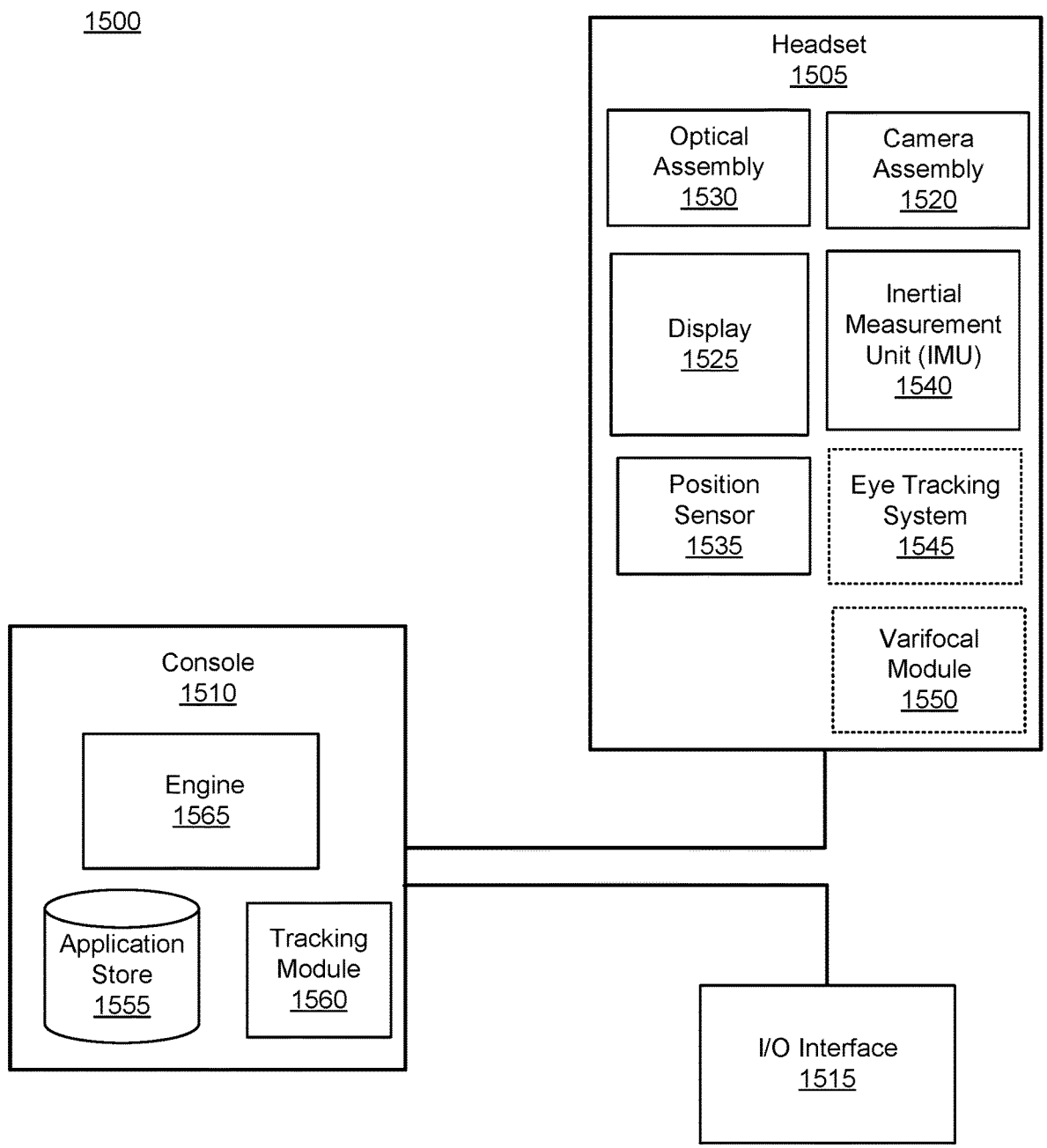
FIG. 15 is a block diagram of a system environment that includes a headset, in accordance with one or more embodiments.

The camera assembly determines 1420 (e.g., via a controller), for each augmented pixel, a difference between the first image data and the second image data. The camera assembly may read out (e.g., via the controller) the difference for each augmented pixel as a differential image of the portion of the local area. The camera assembly may read out (e.g., via the controller) the first image data as a first image of the portion of the local area for reconstruction using the first image and the differential image. The camera assembly may compare (e.g., via the controller), for each augmented pixel, the difference with a threshold difference, and assign a binary value for each augmented pixel based on the comparison. In some embodiments, the camera assembly enables (e.g., via the controller) activation of the drain gate during a drain interval between each two consecutive capture intervals, as shown in FIG. 13A. In some other embodiments, the camera assembly enables (e.g., via the controller) activation of the drain gate during a drain interval that follows the first and second capture intervals, as shown in FIG. 13B. The camera assembly reads out (e.g., via the controller) the difference for each augmented pixel during the drain interval System Environment FIG. 15 is a block diagram of one embodiment of a system 1500 that includes a headset 1505, in accordance with one or more embodiments. The system 1500 may operate in an artificial reality system environment, e.g., a VR system environment, an AR system environment, a MR system environment, or some combination thereof. The system 1500 shown by FIG. 15 comprises a headset 1505 and an input/output (I/O) interface 1515 that is coupled to the console 1510. While FIG. 15 shows an example system 1500 including one headset 1505 and on I/O interface 1515, in other embodiments any number of these components may be included in the system 1500. For example, there may be multiple headsets 1505 each having an associated I/O interface 1515, with each headset 1505 and I/O interface 1515 communicating with the console 1510. In alternative configurations, different and/or additional components may be included in the system 1500. Additionally, functionality described in conjunction with one or more of the components shown in FIG. 15 may be distributed among the components in a different manner than described in conjunction with FIG. 15 in some embodiments. For example, some or all of the functionality of the console 1510 is provided by the headset 1505.

The headset 1505 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the headset 1505, the console 1510, or both, and presents audio data based on the audio information.

The headset 1505 may include a camera assembly 1520, a display 1525, an optical assembly 1530, one or more position sensors 1535, an IMU 1540, an optional eye tracking system 1545, and an optional varifocal module 1550. Some embodiments of the headset 1505 have different components than those described in conjunction with FIG. 15. Additionally, the functionality provided by various components described in conjunction with FIG. 15 may be differently distributed among the components of the headset 1505 in other embodiments.

The camera assembly 1520 determines images for a local area surrounding some or all of the headset 1505. The camera assembly 1520 may also illuminate a portion of a local area with pulses of light and determine depth information for the local area based on captured light reflected from the local area, e.g., using time-of-flight and/or intermediate time-of-flight techniques. The camera assembly 1520 includes an imaging device, a controller, and an optional light source assembly. The light source assembly of the camera assembly 1520 may project pulses of light into the local area. The imaging device of the camera assembly 1520 is configured to image a portion of the local area. The imaging device includes a plurality of augmented pixels, wherein each augmented pixel has a plurality of gates and at least some of the gates have a respective local storage location. An exposure interval of an augmented pixel is divided into intervals that are associated with the gates, and each local storage location stores image data during a respective interval.

In some embodiments, the controller of the camera assembly 1520 is configured to read out, after the exposure interval of each augmented pixel, the image data stored in the respective local storage locations of each augmented pixel to form a plurality of intermediate images that each have a dynamic range. The controller then generates an image for the portion of the local area using the plurality of intermediate images, wherein the image has a higher dynamic range than each of the intermediate images. In some other embodiments, the controller of the camera assembly 1520 is configured to read out, after the exposure interval of each augmented pixel, the image data stored in the respective local storage locations of each augmented pixel to generate a plurality of image data frames. The controller then determines depth information for the local area based in part on the plurality of image data frames. In yet some other embodiments, the controller of the camera assembly 1520 is configured to determine, for each augmented pixel, a difference between first image data stored in a first of the local storage locations and second image data stored in a second of the local storage locations. The controller then reads out the difference for each augmented pixel as a differential image of a portion of the local area. An embodiment of the camera assembly 1520 is the camera assembly 115 described in conjunction with FIGS. 1-14.

The display 1525 displays two-dimensional or three-dimensional images to the user in accordance with data received from the console 1510. In various embodiments, the display 1525 comprises a single display or multiple displays (e.g., a display for each eye of a user). Examples of the electronic display 1525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display 1525 may include the depth information determined by the camera assembly 1520. An embodiment of the display 1525 is the display assembly 210 described above in conjunction with FIG. 2.

The optical assembly 1530 magnifies image light received from the display 1525, corrects optical errors associated with the image light, and presents the corrected image light to a user of the headset 1505. The optical assembly 1530 includes a plurality of optical elements. Example optical elements included in the optical assembly 1530 include: an aperture, a Fresnel lens, a convex lens, a concave lens, a filter, a reflecting surface, or any other suitable optical element that affects image light. Moreover, the optical assembly 1530 may include combinations of different optical elements. In some embodiments, one or more of the optical elements in the optical assembly 1530 may have one or more coatings, such as partially reflective or anti-reflective coatings.

Magnification and focusing of the image light by the optical assembly 1530 allows the display 1525 to be physically smaller, weigh less and consume less power than larger displays. Additionally, magnification may increase the field of view of the content presented by the display 1525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 1530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 1525 for display is pre-distorted, and the optical assembly 1530 corrects the distortion when it receives image light from the display 1525 generated based on the content.

The IMU 1540 is an electronic device that generates data indicating a position of the headset 1505 based on measurement signals received from one or more of the position sensors 1535 and from depth information received from the camera assembly 1520. A position sensor 1535 generates one or more measurement signals in response to motion of the headset 1505. Examples of position sensors 1535 include: one or more accelerometers, one or more gyroscopes, one or more magnetometers, another suitable type of sensor that detects motion, a type of sensor used for error correction of the IMU 1540, or some combination thereof. The position sensors 1535 may be located external to the IMU 1540, internal to the IMU 1540, or some combination thereof.

In some embodiments, the eye tracking system 1545 is integrated into the headset 1505. The eye tracking system 1545 determines eye tracking information associated with an eye of a user wearing the headset 1505. The eye tracking information determined by the eye tracking system 1545 may comprise information about a position of the user's eye, i.e., information about an angle of an eye-gaze. The eye-tracking system 1545 may comprise one or more illumination sources and an imaging device (camera).

In some embodiments, the varifocal module 1550 is further integrated into the headset 1505. The varifocal module 1550 may be coupled to the eye tracking system 1545 to obtain eye tracking information determined by the eye tracking system 1545. The varifocal module 1550 may be configured to adjust focus of image light emitted from the display 1525, based on the determined eye tracking information obtained from the eye tracking system 1545. In this way, the varifocal module 1550 can mitigate vergence-accommodation conflict in relation to the image light. The varifocal module 1550 can be interfaced (e.g., either mechanically or electrically) with at least one optical element of the optical assembly 1530. Then, the varifocal module 1550 may be configured to adjust focus of the image light emitted from the display 1525 and propagated through the optical assembly 1530 by adjusting an optical position of the at least one optical element of the optical assembly 1530, based on the determined eye tracking information obtained from the eye tracking system 1545. By adjusting the optical position, the varifocal module 1550 varies focus of the image light propagated through the optical assembly 1530 towards the user's eye. The varifocal module 1550 may be also configured to adjust resolution of the image light emitted by the display 1525 by performing foveated rendering of the image light, based at least in part on the determined eye tracking information obtained from the eye tracking system 1545. In this case, the varifocal module 1550 provides appropriate image signals to the display 1525. The varifocal module 1550 provides image signals with a maximum pixel density for the display 1525 only in a foveal region of the user's eye-gaze, while providing image signals with lower pixel densities in other regions.

The I/O interface 1515 is a device that allows a user to send action requests and receive responses from the console 1510. An action request is a request to perform a particular action. For example, an action request may be an instruction to start or end capture of image or video data or an instruction to perform a particular action within an application. The I/O interface 1515 may include one or more input devices. Example input devices include: a keyboard, a mouse, a game controller, or any other suitable device for receiving action requests and communicating the action requests to the console 1510. An action request received by the I/O interface 1515 is communicated to the console 1510, which performs an action corresponding to the action request. In some embodiments, the I/O interface 1515 includes an IMU 1540 that captures calibration data indicating an estimated position of the I/O interface 1515 relative to an initial position of the I/O interface 1515. In some embodiments, the I/O interface 1515 may provide haptic feedback to the user in accordance with instructions received from the console 1510. For example, haptic feedback is provided when an action request is received, or the console 1510 communicates instructions to the I/O interface 1515 causing the I/O interface 1515 to generate haptic feedback when the console 1510 performs an action.

The console 1510 provides content to the headset 1505 for processing in accordance with information received from one or more of: the camera assembly 1520, the headset 1505, and the I/O interface 1515. In the example shown in FIG. 15, the console 1510 includes an application store 1555, a tracking module 1560, and an engine 1565. Some embodiments of the console 1510 have different modules or components than those described in conjunction with FIG. 15. Similarly, the functions further described below may be distributed among components of the console 1510 in a different manner than described in conjunction with FIG. 15.

The application store 1555 stores one or more applications for execution by the console 1510. An application is a group of instructions, that when executed by a processor, generates content for presentation to the user. Content generated by an application may be in response to inputs received from the user via movement of the headset 1505 or the I/O interface 1515. Examples of applications include: gaming applications, conferencing applications, video playback applications, or other suitable applications.

The tracking module 1560 calibrates the system 1500 using one or more calibration parameters and may adjust one or more calibration parameters to reduce error in determination of the position of the headset 1505 or of the I/O interface 1515. For example, the tracking module 1560 communicates a calibration parameter to the camera assembly 1520 to adjust the focus of the camera assembly 1520 to more accurately determine depth information for the local area. Calibration performed by the tracking module 1560 also accounts for information received from the IMU 1540 in the headset 1505 and/or an IMU 1540 included in the I/O interface 1515. Additionally, if tracking of the headset 1505 is lost, the tracking module 1560 may re-calibrate some or all of the system 1500.

The tracking module 1560 tracks movements of the headset 1505 or of the I/O interface 1515 using information from the camera assembly 1520, the one or more position sensors 1535, the IMU 1540 or some combination thereof. For example, the tracking module 1560 determines a position of a reference point of the headset 1505 in a mapping of a local area based on information from the headset 1505. The tracking module 1560 may also determine positions of the reference point of the headset 1505 or a reference point of the I/O interface 1515 using data indicating a position of the headset 1505 from the IMU 1540 or using data indicating a position of the I/O interface 1515 from an IMU 1540 included in the I/O interface 1515, respectively. Additionally, in some embodiments, the tracking module 1560 may use portions of data indicating a position or the headset 1505 from the IMU 1540 as well as representations of the local area from the camera assembly 1520 to predict a future location of the headset 1505. The tracking module 1560 provides the estimated or predicted future position of the headset 1505 or the I/O interface 1515 to the engine 1565.

The engine 1565 generates a three-dimensional mapping of the area surrounding the headset 1505 (i.e., the "local area") based on information received from the headset 1505.

In some embodiments, the engine 1565 determines depth information for the three-dimensional mapping of the local area based on information received from the camera assembly 1520 that is relevant for techniques used in computing depth. The engine 1565 may calculate depth information for the local area based in part on the image data stored in respective local storage locations of each augmented pixel of the camera assembly 1520, e.g., using TOF and/or iTOF techniques. In various embodiments, the engine 1565 uses the depth information to, e.g., update a model of the local area, and generate content based in part on the updated model.

The engine 1565 also executes applications within the system 1500 and receives position information, acceleration information, velocity information, predicted future positions, or some combination thereof, of the headset 1505 from the tracking module 1560. Based on the received information, the engine 1565 determines content to provide to the headset 1505 for presentation to the user. For example, if the received information indicates that the user has looked to the left, the engine 1565 generates content for the headset 1505 that mirrors the user's movement in a virtual environment or in an environment augmenting the local area with additional content. Additionally, the engine 1565 performs an action within an application executing on the console 1510 in response to an action request received from the I/O interface 1515 and provides feedback to the user that the action was performed. The provided feedback may be visual or audible feedback via the headset 1505 or haptic feedback via the I/O interface 1515.

In some embodiments, based on the eye tracking information (e.g., orientation of the user's eye) received from the eye tracking system 1545, the engine 1565 determines resolution of the content provided to the headset 1505 for presentation to the user on the display 1525. The engine 1565 may be configured to adjust resolution of the content provided to the headset 1505 by performing foveated rendering of the presented content, based at least in part on the determined eye tracking information obtained from the eye tracking system 1545. The engine 1565 provides the content to the headset 1505 having a maximum resolution on the display 1525 in a foveal region of the user's gaze, whereas the engine 1565 provides a lower resolution in other regions, thus achieving less power consumption at the headset 1505 and saving computing cycles of the console 1510 without compromising a visual experience of the user. In some embodiments, the engine 1565 can further use the eye tracking information to adjust focus of the image light emitted from the display 1525 to prevent the vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A camera assembly comprising:
    a sensor including a plurality of pixels, each pixel having a plurality of storage locations, wherein an exposure interval of each pixel is divided into a plurality of capture intervals and a plurality of drain intervals, each storage location stores image data during a respective capture interval interleaved within the exposure interval with at least one of the capture intervals associated with at least one of the storage locations; and
    a controller configured to:
        enable activation of a drain gate of each pixel during each drain interval between two of the capture intervals associated with the same two of the storage locations, and
        read out, after the exposure interval, image data stored in the storage locations of each pixel.

2. The camera assembly of claim 1, wherein the controller is further configured to:
    generate each pixel value of each intermediate image of a plurality of intermediate images using image data stored in a corresponding storage location of each pixel captured during corresponding capture intervals of the exposure interval associated with the corresponding storage location.

3. The camera assembly of claim 2, wherein the controller is further configured to:
generate an image for at least a portion of a local area using the intermediate images, the image having a higher dynamic range than each of the intermediate images.

4. The camera assembly of claim 2, wherein the controller is further configured to:
generate an image for at least a portion of a local area by applying a reconstruction algorithm on the intermediate images.

5. The camera assembly of claim 2, wherein the controller is further configured to:
generate an image for at least a portion of a local area by applying a machine learning algorithm on the intermediate images.

6. The camera assembly of claim 2, wherein each capture interval associated with a respective storage location is different, and each intermediate image is associated with a different exposure value of the camera assembly.

7. The camera assembly of claim 2, wherein each capture interval associated with a respective storage location is a same time interval while having a different number of repetitions within the exposure interval, and each intermediate image is associated with a different exposure value of the camera assembly.

8. The camera assembly of claim 1, wherein a first exposure interval of a first pixel of the plurality of pixels is different than a second exposure interval of a second pixel of the plurality of pixels.

9. The camera assembly of claim 1, wherein the controller is further configured to:
assign a duration of the exposure interval for each pixel based on a distance between each pixel and at least one object in a local area imaged at least partially by each pixel.

10. The camera assembly of claim 1, wherein the controller is further configured to:
assign a duration of the exposure interval for each pixel, based on a brightness of at least one object in a local area imaged at least partially by each pixel.

11. The camera assembly of claim 1, wherein the controller is further configured to:
assign a number of capture intervals for repetition within the exposure interval for each pixel based on a distance between each pixel and at least one object in a local area imaged at least partially by each pixel.

12. The camera assembly of claim 1, wherein the controller is further configured to:
assign a number of capture intervals for repetition within the exposure interval for each pixel based on a brightness of at least one object in a local area imaged at least partially by each pixel.

13. The camera assembly of claim 1, wherein the camera assembly is part of a headset.

14. A method comprising:
instructing a sensor to image at least a portion of a local area, the sensor including a plurality of pixels, each pixel having a plurality of storage locations, wherein an exposure interval of each pixel is divided into a plurality of capture intervals and a plurality of drain intervals, each storage location stores image data during a respective capture interval interleaved within the exposure interval with at least one of the capture intervals associated with at least one of the storage locations;
enabling activation of a drain gate of each pixel during each drain interval between two of the capture intervals associated with the same two of the storage locations; and
reading out, after the exposure interval, the image data stored in the storage locations of each pixel.

15. The method of claim 14, further comprising:
generating each pixel value of each intermediate image of a plurality of intermediate images using image data stored in a corresponding storage location of each pixel captured during corresponding capture intervals of the exposure interval associated with the corresponding storage location.

16. The method of claim 15, further comprising:
generating an image for at least the portion of the local area using the intermediate images, the image having a higher dynamic range than each of the intermediate images.

17. The method of claim 15, further comprising:
generating an image for at least the portion of the local area by applying a reconstruction algorithm on the intermediate images.

18. The method of claim 14, further comprising:
assigning a duration of the exposure interval for each pixel based on a distance between each pixel and at least one object in the local area imaged at least partially by each pixel.

19. The method of claim 14, further comprising:
assigning a duration of the exposure interval for each pixel, based on a brightness of at least one object in the local area imaged at least partially by each pixel.

20. A camera assembly comprising:
a sensor including a plurality of pixels, each pixel having a plurality of storage locations, wherein an exposure interval of each pixel is divided into a plurality of capture intervals and a plurality of drain intervals, each storage location stores image data during a respective capture interval interleaved within the exposure interval with at least one of the capture intervals associated with at least one of the storage locations; and
a controller configured to:
enable activation of a drain gate of each pixel during each drain interval between two of the capture intervals associated with the same two of the storage locations,
read out, after the exposure interval, the image data stored in the storage locations of each pixel to form a plurality of intermediate images, and
generate an image for at least a portion of a local area using the intermediate images, the image having a higher dynamic range than each of the intermediate images.

* * * * *